United States Patent
Liu et al.

(10) Patent No.: US 11,069,322 B2
(45) Date of Patent: Jul. 20, 2021

(54) DISPLAY METHOD AND DISPLAY DEVICE, VISIBLE LIGHT COMMUNICATION TRANSMISSION METHOD AND DEVICE

(71) Applicant: BOE TECHNOLOGY GROUP CO., LTD., Beijing (CN)

(72) Inventors: Kairan Liu, Beijing (CN); Yingyi Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/634,839

(22) PCT Filed: May 10, 2019

(86) PCT No.: PCT/CN2019/086414
§ 371 (c)(1),
(2) Date: Jan. 28, 2020

(87) PCT Pub. No.: WO2020/001176
PCT Pub. Date: Jan. 2, 2020

(65) Prior Publication Data
US 2021/0118403 A1    Apr. 22, 2021

(30) Foreign Application Priority Data
Jun. 29, 2018 (CN) .......................... 201810714376.7

(51) Int. Cl.
*G09G 5/10* (2006.01)
*G09G 3/20* (2006.01)
*H04B 10/116* (2013.01)

(52) U.S. Cl.
CPC .................. *G09G 5/10* (2013.01); *G09G 3/20* (2013.01); *G09G 2320/0233* (2013.01); *G09G 2320/0646* (2013.01); *H04B 10/116* (2013.01)

(58) Field of Classification Search
CPC .... G09G 5/10; G09G 3/20; G09G 2320/0233; G09G 2320/0646; H04B 10/116;
(Continued)

(56) References Cited

U.S. PATENT DOCUMENTS 10,217,353 B2* 2/2019 Guan .................. G06F 3/1415
2011/0216049 A1 9/2011 Jun et al.
(Continued)

FOREIGN PATENT DOCUMENTS

CN 104793423 A 7/2015
CN 105141360 A 12/2015
(Continued)

OTHER PUBLICATIONS

First Chinese Office Action dated Aug. 27, 2019, received for corresponding Chinese Application No. 201810714376.7, 20 pages.

*Primary Examiner* — Rodney Amadiz
(74) *Attorney, Agent, or Firm* — Kinney & Lange, P.A.

(57) ABSTRACT

The present disclosure is directed to a display method and a display device, a visible light communication transmission method and device, and a computer-readable storage medium. The display method includes: acquiring an image frame to be displayed and a corresponding binary code stream; adjusting a grayscale value of a corresponding pixel point in the image frame to be displayed based on a grayscale adjustment information set corresponding to each code element in the binary code stream, to obtain a first image frame and a second image frame that are different from the image frame to be displayed; and displaying the first image frame and the second image frame.

16 Claims, 14 Drawing Sheets

(58) Field of Classification Search
CPC ................ H04N 11/06; H04N 19/467; H04N 21/43637; H04N 1/32144; H04N 9/64; H04N 21/4122; H04N 21/4126; H04N 21/42204; H04N 21/431; H04N 21/44008
See application file for complete search history.

(56) References Cited

U.S. PATENT DOCUMENTS

| | | |
|---|---|---|
| 2016/0134367 A1 | 5/2016 | Bitauld |
| 2018/0253962 A1 | 9/2018 | Guan et al. |

FOREIGN PATENT DOCUMENTS

| | | |
|---|---|---|
| CN | 105359431 A | 2/2016 |
| CN | 105389148 A | 3/2016 |
| CN | 107196705 A | 9/2017 |
| CN | 107295344 A | 10/2017 |
| CN | 107301366 A | 10/2017 |
| CN | 107454351 A | 12/2017 |
| CN | 107682692 A | 2/2018 |
| CN | 108923853 A | 11/2018 |

\* cited by examiner

DISPLAY METHOD AND DISPLAY DEVICE, VISIBLE LIGHT COMMUNICATION TRANSMISSION METHOD AND DEVICE

CROSS-REFERENCE TO RELATED APPLICATION(S)

This application is the national phase of PCT Application No. PCT/CN2019/086414 filed on May 10, 2019, which in turn claims priority to Chinese Application No. 201810714376.7, entitled "DISPLAY METHOD AND DISPLAY DEVICE, VISIBLE LIGHT COMMUNICATION TRANSMISSION METHOD AND DEVICE" and filed on Jun. 29, 2018, which is incorporated herein by reference in its entirety.

TECHNICAL FIELD

The present disclosure relates to the field of communication technologies, and in particular, to a display method and a display device, a visible light communication transmission method and device, and a computer-readable storage medium.

BACKGROUND

Visible light communication technology refers to a communication method that transmits optical signals directly in the air using light in the visible light band as an information carrier without a transmission medium, such as optical fiber, which may cover the range reached by the light, and thus has broad development prospects.

SUMMARY

According to a first aspect of the embodiments of the present disclosure, there is provided a display method, which includes:

acquiring an image frame to be displayed and a corresponding binary code stream;

adjusting a grayscale value of a corresponding pixel point in the image frame to be displayed based on a grayscale adjustment information set corresponding to each code element in the binary code stream, to obtain a first image frame and a second image frame that are different from the image frame to be displayed; and displaying the first image frame and the second image frame.

Alternatively, said adjusting the grayscale value of the corresponding pixel point in the image frame to be displayed based on the grayscale adjustment information set corresponding to each code element in the binary code stream to obtain the first image frame and the second image frame that are different from the image frame to be displayed includes:

acquiring the grayscale adjustment information set corresponding to each code element, the grayscale adjustment information set comprising a first grayscale compensation value and a second grayscale compensation value; and adjusting the grayscale value of each pixel point in the image frame to be displayed according to the first grayscale compensation value to obtain the first image frame, and adjusting the grayscale value of each pixel point in the image frame to be displayed according to the second grayscale compensation value to obtain the second image frame.

Alternatively, said adjusting the grayscale value of each pixel point in the image frame to be displayed according to the first grayscale compensation value to obtain the first image frame includes:

calculating, for each pixel point in the image frame to be displayed, an algebraic sum of the grayscale value of the pixel point and the first grayscale compensation value; and determining the algebraic sum as a grayscale value of the corresponding pixel point in the first image frame;

or, said adjusting the grayscale value of each pixel in the image frame to be displayed according to the second grayscale compensation value to obtain the second image frame includes:

calculating, for each pixel point in the image frame to be displayed, an algebraic sum of the grayscale value of each pixel point and the second grayscale compensation value; and determining the algebraic sum as a grayscale value of the corresponding pixel point in the second image frame.

Alternatively, prior to adjusting the grayscale value of the corresponding pixel point in the image frame to be displayed based on the grayscale adjustment information set corresponding to each code element in the binary code stream, the method further includes:

compressing the grayscale of each pixel point in the image frame to be displayed according to a preset grayscale compression formula.

Alternatively, said adjusting the grayscale value of the corresponding pixel point in the image frame to be displayed based on the grayscale adjustment information set corresponding to each code element in the binary code stream includes:

if the pixel point includes M1 sub-pixels, adjusting grayscale values of M2 sub-pixels in the M1 sub-pixels, where M1 is a positive integer greater than or equal to 3, and M2 is a positive integer less than or equal to M1.

Alternatively, when the image frame to be displayed is divided into Z regions where Z is a positive integer, prior to adjusting the grayscale value of the corresponding pixel point in the image frame to be displayed based on the grayscale adjustment information set corresponding to each code element in the binary code stream, the method further includes:

determining a region where the pixel point corresponding to each code element in the binary code stream is located, the region where the pixel point corresponding to each code element is located being one of the Z regions; and determining a grayscale adjustment information set corresponding to the region as the grayscale adjustment information set corresponding to the code element, based on a corresponding relationship between regions and grayscale adjustment information sets.

Alternatively, the first grayscale compensation values in the grayscale adjustment information sets corresponding to different regions in the image frame to be displayed are different, and/or the second grayscale compensation values in the grayscale adjustment information sets corresponding to different regions in the image frame to be displayed are different.

Alternatively, the first grayscale compensation value is a positive number, and the second grayscale compensation value is a negative number.

Alternatively, the first grayscale compensation value and the second grayscale compensation value are mutually opposite numbers.

According to a second aspect of the embodiments of the present disclosure, there is provided a visible light communication transmission method, which includes:

acquiring two image frames from a video stream, wherein corresponding pixel points in the two image frames are identical except for grayscale values of the corresponding pixel points;

acquiring a grayscale amplitude image from the two image frames;

acquiring a binary code stream according to the grayscale amplitude image, based on a corresponding relationship between grayscale amplitudes and code elements;

determining content needed to be rendered based on the binary code stream; and outputting the content needed to be rendered.

Alternatively, prior to acquiring the binary code stream according to the grayscale amplitude image, the method further includes:

dividing the grayscale amplitude image into Z regions according to a criterion that the grayscale amplitude variation amount is the same within a region, where Z is a positive integer;

wherein said acquiring the binary code stream according to the grayscale amplitude image based on the corresponding relationship between grayscale amplitudes and code elements includes:

acquiring a binary code stream corresponding to at least one of the Z regions of the grayscale amplitude image, based on a corresponding relationship between grayscale amplitudes and code elements.

Alternatively, prior to adjusting the binary code stream corresponding to the at least one of the Z regions of the grayscale amplitude image based on the corresponding relationship between grayscale amplitudes and code elements, the method includes:

acquiring historical data stored locally;

determining behavior preference characteristics of a target object based on the historical data; and determining a region corresponding to the behavior preference characteristics based on a corresponding relationship between behavior preference characteristics and grayscale amplitudes;

wherein said acquiring the binary code stream corresponding to the at least one of the Z regions of the grayscale amplitude image includes:

acquiring a binary code stream of the region of the grayscale amplitude image corresponding to the behavior preference characteristics.

According to a third aspect of the embodiments of the present disclosure, there is provided a display device, which includes:

a code stream acquisition module, configured to acquire an image frame to be displayed and a corresponding binary code stream;

an image frame acquisition module, configured to adjust a grayscale value of a corresponding pixel point in the image frame to be displayed based on a grayscale adjustment information set corresponding to each code element in the binary code stream, to obtain a first image frame and a second image frame that are different from the image frame to be displayed; and an image frame display module, configured to display the first image frame and the second image frame.

According to a fourth aspect of the embodiments of the present disclosure, there is provided a display device, which includes: a display; a memory storing computer program codes; and a processor configured to execute the computer program codes to:

acquire an image frame to be displayed and a corresponding binary code stream;

adjust a grayscale value of a corresponding pixel point in the image frame to be displayed based on a grayscale adjustment information set corresponding to each code element in the binary code stream, to obtain a first image frame and a second image frame that are different from the image frame to be displayed; and control the display to display the first image frame and the second image frame.

According to a fifth aspect of the embodiments of the present disclosure, there is provided a visible light communication transmission device, which includes:

an image frame acquisition module, configured to acquire two image frames from a video stream, wherein corresponding pixel points in the two image frames are identical except for grayscale values of the corresponding pixel points;

an amplitude image acquisition module, configured to acquire a grayscale amplitude image from the two image frames;

a code stream acquisition module, configured to acquire a binary code stream according to the grayscale amplitude image based on a corresponding relationship between grayscale amplitudes and code elements;

a rendered content determination module, configured to determine content needed to be rendered based on the binary code stream; and a rendered content output module, configured to output the content needed to be rendered.

According to a sixth aspect of the embodiments of the present disclosure, there is provided a visible light communication transmission device, which includes: a memory storing computer program codes; and a processor configured to execute the computer program codes to:

acquire two image frames from a video stream, wherein corresponding pixel points in the two image frames are identical except for grayscale values of the corresponding pixel points;

acquire a grayscale amplitude image from the two image frames;

acquire a binary code stream according to the grayscale amplitude image, based on a corresponding relationship between grayscale amplitudes and code elements;

determine content needed to be rendered based on the binary code stream; and output the content needed to be rendered.

According to a seventh aspect of the embodiments of the present disclosure, there is provided a computer-readable storage medium, having stored thereon a computer program, wherein the program, when executed by a processor, performs the steps of the method according to the first aspect, or the steps of the method according to the second aspect.

It should be understood that the above general description and the following detailed description are merely exemplary and explanatory, but should not limit the present disclosure.

BRIEF DESCRIPTION OF THE DRAWINGS

The drawings herein are incorporated in and constitute a part of the present specification, which illustrate the embodiments consistent with the present disclosure and explain the principles of the present disclosure together with the description.

DETAILED DESCRIPTION

Exemplary embodiments will be described in detail here, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure, as detailed in the appended claims.

At present, the simplest visible light communication is to use OOK (On-Off Keying) to enable the backlight of the LCD display to represent a code stream of "01010110 . . . " by flicker, acquire black and white stripes by photographing the display, and then decode the black and white stripes to obtain the original information. However, in the existing visible light communication, there are problems that image distortion may be caused when the grayscale amplitude is too large, and the photographing device cannot recognize the grayscale and thus it cannot be decoded when the grayscale amplitude is too small.

Figure 1:
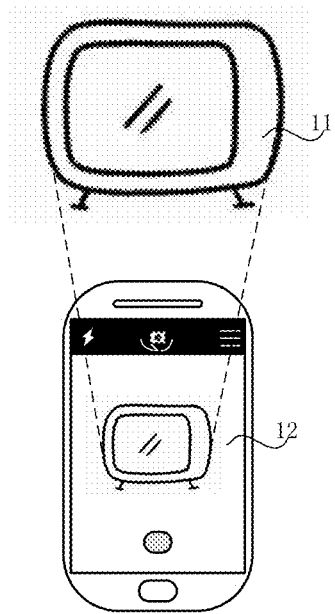
FIG. 1 is a schematic diagram of an application scenario according to an embodiment of the present disclosure.

In order to solve the above problems, an embodiment of the present disclosure provides a visible light communication display method. FIG. 1 is a schematic diagram of an application scenario according to an embodiment of the present disclosure. Referring to FIG. 1, the display device 11 acquires a video stream and a binary code stream, and acquires image frames to be displayed from the video stream sequentially, and acquires a binary code stream corresponding to each of the image frames to be displayed from the binary code stream. Then, the display device 11 adjusts a grayscale value of a pixel point in the corresponding image frame to be displayed according to a grayscale adjustment information set corresponding to each code element in the binary code stream, to obtain a first image frame and a second image frame which are corresponding to the image frame to be displayed but different from the image frame to be displayed. Next, the display device 11 displays the first image frame and the second image frame. In this way, the display device 11 may display two types of information to the user: first, the first image frame and the second image frame that the user may directly view; second, contents needed to be rendered to the user, which correspond to the grayscale difference between the first image frame and the second image frame, i.e., the corresponding binary code stream. The contents needed to be rendered to the user are invisible with naked eyes, and need to be processed by the terminal.

Continuing to refer to FIG. 1, the user may capture pictures displayed on the display device 11 by a terminal 12 to obtain a video stream; or the user may record the pictures displayed on the display device 11 by the terminal 12 to obtain the video stream; or the user may acquire the video stream by the terminal 12 via a network connected to the display device 11. Then, the terminal 12 obtains the first image frame and the second image frame from the video stream (that is, two image frames obtained by applying grayscale variations to the same image frame to be displayed), and then obtains a grayscale amplitude of each pixel point of the image frame to be displayed based on the first image frame and the second image frame.

Figure 2:
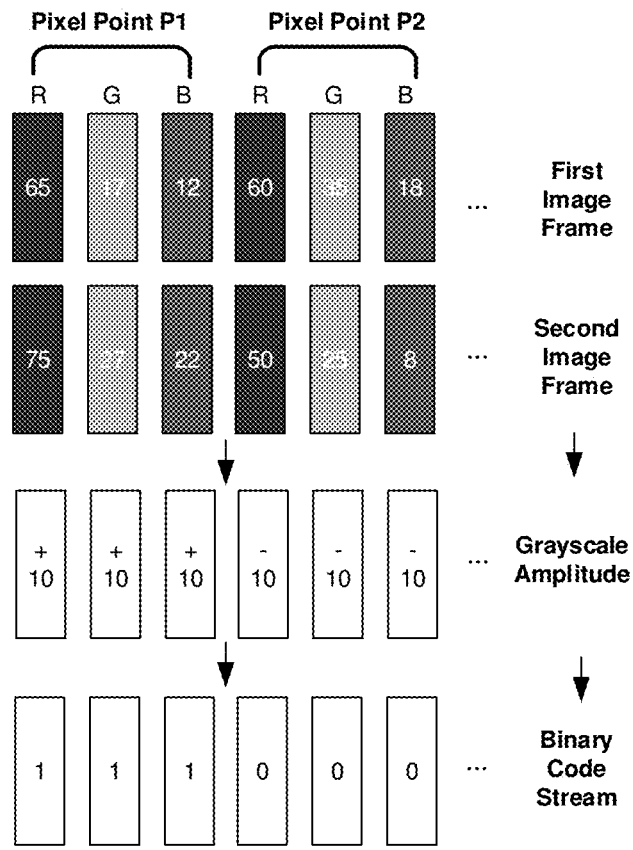
FIG. 2 is a schematic diagram of a result of a visible light communication process according to an embodiment of the present disclosure.

Referring to FIG. 2, taking the pixel point P1 and the pixel point P2 as an example, each pixel point includes a red sub-pixel R, a green sub-pixel G, and a blue sub-pixel B. For the pixel point P1, the grayscales of corresponding sub-pixels RGB in the first image frame are 65, 17, 12 respectively, and the grayscales of corresponding sub-pixels RGB in the second image frame are 75, 27, 22, respectively. Thus, the grayscale amplitudes of the pixel point P1 in the first image frame and the second image frame are +10, +10, +10, respectively. For the pixel point P2, the grayscales of corresponding sub-pixels RGB in the first image frame are 60, 35, 18, respectively, and the grayscales of corresponding sub-pixels RGB in the second image frame are 50, 25, 8, respectively. Thus, the grayscale amplitudes of the pixel point P2 in the first image frame and the second image frame are −10, −10, −10, respectively. Assuming that "+10" corresponds to the code element "1", and "−10" corresponds to the code element "0" as an example, a binary code stream "111000" may be obtained according to the first pixel point P1 and the second pixel point P2. Finally, the terminal converts the binary code stream into corresponding content, such as text and images, and renders to the user, so that the user may view the second type of information.

Referring to FIG. 1 and FIG. 2, in the present embodiment, the process in which the display device 11 renders the video stream, and the terminal 12 acquires the video stream and obtains the second type of information implements the visible light communication.

It may be seen that the display device in the embodiments of the present disclosure may display the video stream, and may also provide the visible light communication, thereby improving the display efficiency and the transmission efficiency. In addition, in the embodiments of the present disclosure, the visible light information may be acquired by the terminal, which may increase the amount of information obtained by the user and improve the viewing experience of the user.

Figure 3:
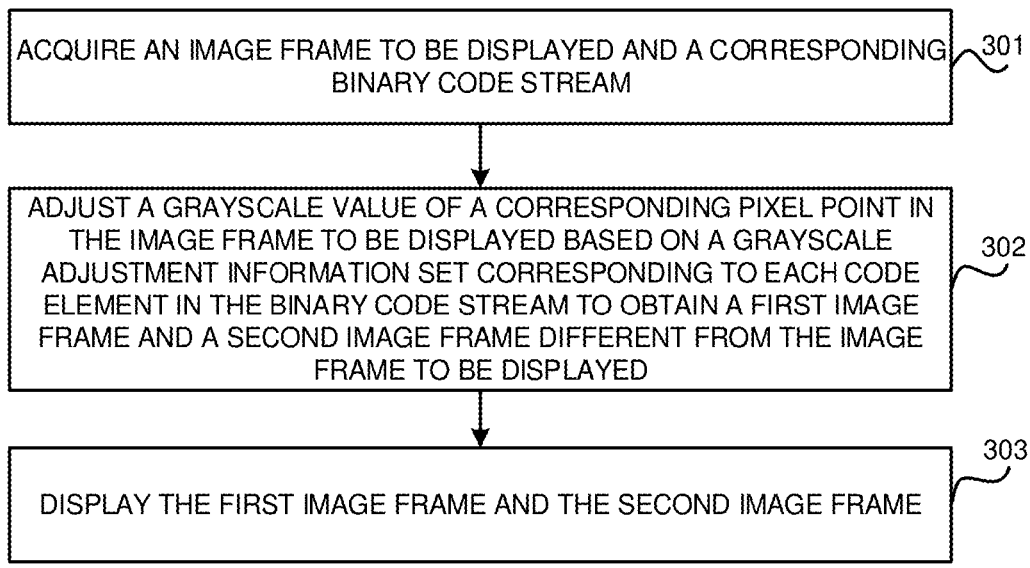
FIG. 3 is a schematic flowchart of a display method according to an embodiment of the present disclosure.

For the above application scenario, an embodiment of the present disclosure provides a display method. FIG. 3 is a schematic flowchart of a display method according to an embodiment of the present disclosure. The display method is suitable for electronic devices such as a server, a display device, and a mobile terminal. For ease of description, the following embodiments take the display device performing the display method as an example for description. Referring to FIG. 3, the display method includes the following steps.

301. Acquire an image frame to be displayed and a corresponding binary code stream.

In the present embodiment, the display device may acquire the video stream from a specified location, and then acquire the image frame to be displayed from the video stream. The specified location may be a server, a local storage, or a mobile storage medium, and may be configured according to particular scenarios, which is not limited herein.

In the present embodiment, the display device may obtain the binary code stream from the specified position. The binary code stream is also represented in a frame, that is, one frame of the binary code stream corresponding to one image frame to be displayed. The binary code stream may be converted by the display device from the content needed to be rendered to the user, or may be converted in advance by the provider and stored in a specified location, and an appropriate conversion method may be selected according to particular scenarios, which is not limited herein.

It should be noted that the frequency at which the display device displays the image frame to be displayed may be the first frequency, for example, 50~120 Hz. In addition, the frequency at which the display device displays the content needed to be rendered to the user may be the second frequency, for example, 10~120 Hz. Therefore, the display device may adjust the frequencies of the image frame to be displayed and the binary code stream to match with each other.

Figure 4:
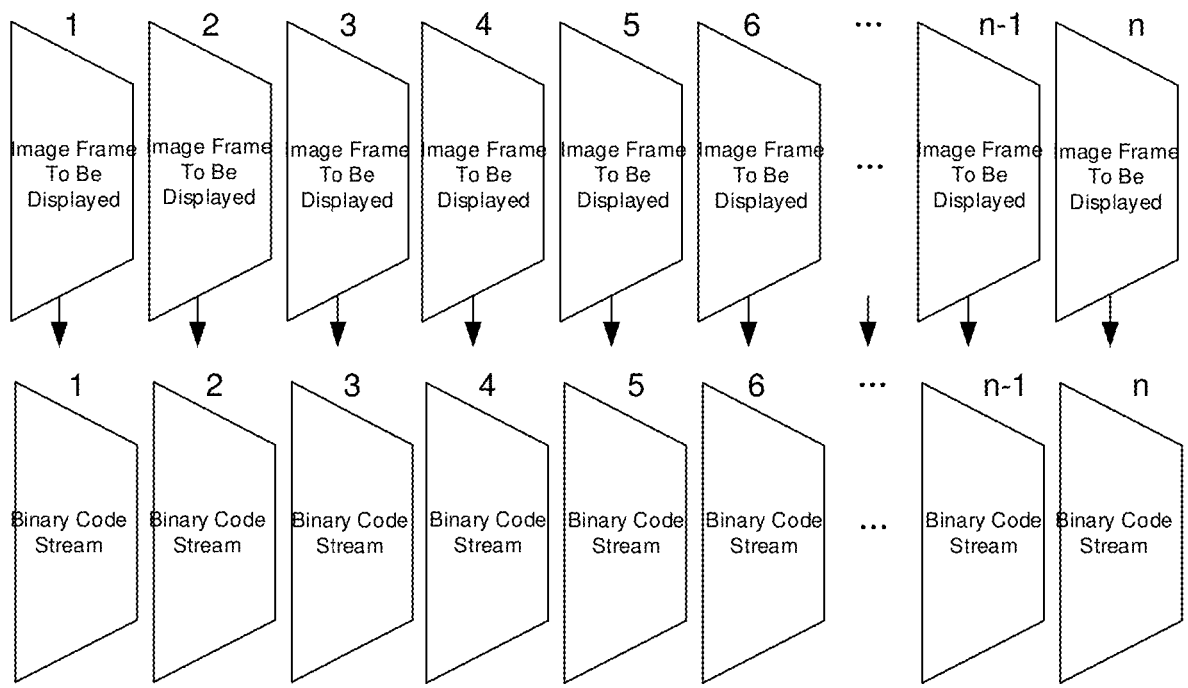
FIGS. 4 to 5 are schematic diagrams illustrating a corresponding relationship between image frames to be displayed and binary code streams according to an embodiment of the present disclosure.

For example, referring to FIG. 4, when the content needed to be rendered to the user, i.e., the number of (frames of) the binary code stream is larger, one image frame to be displayed in the first row of FIG. 4 corresponds to one frame of the binary code stream in the second row of FIG. 4.

Figure 5:
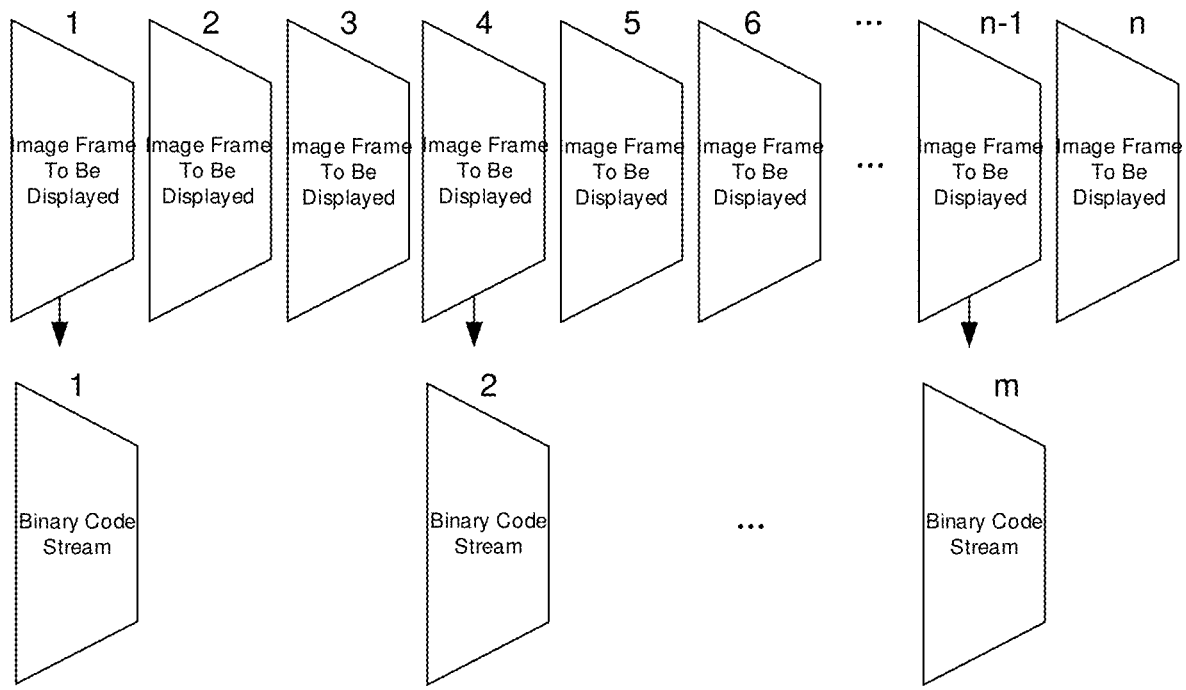

As another example, referring to FIG. 5, when the content needed to be rendered to the user, i.e., the number of (frames of) the binary code stream is smaller, a plurality of image frames to be displayed in the first row correspond to one frame of the binary code stream in the second row.

In addition, continuing to refer to FIG. 5, assuming that every 3 image frames to be displayed correspond to one frame of the binary code stream, the display device may perform grayscale processing on only the first image frame to be displayed according to the first frame of the binary code stream, but not on the second and the third image frames to be displayed. That is, the grayscale processing is performed on one of a plurality of image frames to be displayed. Of course, the display device may also perform the grayscale processing on the first, the second and the third image frames to be displayed according to the first frame of the binary code stream, i.e., perform the same grayscale processing on all of the plurality of image frames to be displayed.

It may be understood that the skilled in the art may select an appropriate way according to particular scenarios, such as computing resources of the display device, the display frequency, and the content to be rendered to a user, which may not be limited herein.

302. Adjust grayscale values of a corresponding pixel point in the image frame to be displayed based on a grayscale adjustment information set corresponding to each code element in the binary code stream to obtain the first image frame and the second image frame that are different from the image frame to be displayed.

Figure 6:
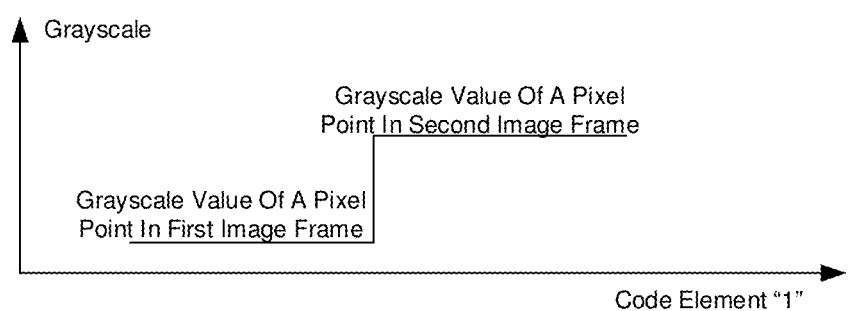
FIGS. 6 to 7 are schematic diagrams illustrating a corresponding relationship between binary code elements and grayscale variations according to an embodiment of the present disclosure.
Figure 7:
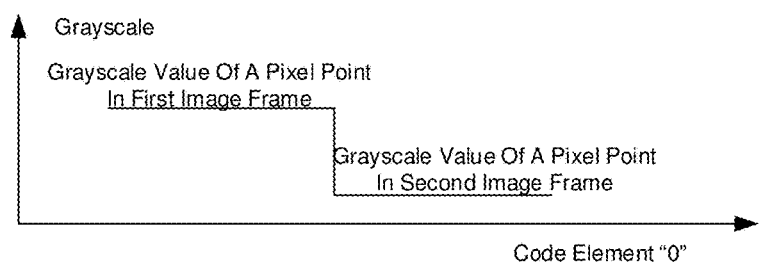

In the present embodiment, referring to FIG. 6, in order to reflect the relationship between the grayscale values in the image frame to be displayed and the code elements in the binary code stream, it may be preset that the grayscale value increment, i.e., a grayscale value of a pixel point in the second image frame being higher than a grayscale value of the corresponding pixel point in the first image frame, corresponds to the code element "1". Referring to FIG. 7, it may be preset that the grayscale value decrement, i.e., a grayscale value of a pixel point in the second image frame being lower than a grayscale value of the corresponding pixel point in the first image frame, corresponds to the code element "0".

Therefore, each code element in the binary code stream may correspond to a grayscale adjustment information set, and the grayscale adjustment information set includes a first grayscale compensation value and a second grayscale compensation value. Optionally, the grayscale adjustment information set may further include information indicating a setting order of the first grayscale compensation value and the second grayscale compensation value. Optionally, the grayscale adjustment information set may further include an adjustment object and an adjustment amount targeted by the first grayscale compensation value and the second grayscale compensation value. The grayscale compensation value is an adjustment amount of the grayscale value of the pixel point. When the grayscale compensation value is a positive number, it means that a grayscale value corresponding to the grayscale compensation value is added to the grayscale value of the pixel point; and when the value is a negative number, it means that a grayscale value corresponding to the grayscale compensation value is subtracted from the grayscale value of the pixel point.

In the present embodiment, the first grayscale compensation value N is a positive number, and the second grayscale compensation value M is a negative number. For example, when the first grayscale compensation value corresponds to the first image frame and the second grayscale compensation value corresponds to the second image frame, the grayscale difference between the second image frame and the first image frame is negative, corresponding to the code element "0". For another example, when the second grayscale compensation value corresponds to the first image frame and the first grayscale compensation value corresponds to the second image frame, the grayscale difference between the second image frame and the first image frame is a positive number, corresponding to the code element "1". In an embodiment, the setting order of the first grayscale compensation value and the second grayscale compensation value refers to the correspondence between the first grayscale compensation value and the second grayscale compensation value with the first image frame and the second image frame. By adjusting the setting order of the first grayscale compensation value and the second grayscale compensation value, it may be guaranteed that the grayscale differences between the first image frame and the second image frame match the code elements "1" and "0". The correspondence between the first grayscale compensation value and the second grayscale compensation value with the first image frame and the second image frame may be determined by the positions of the first grayscale compensation value and the second grayscale compensation value, so that the information indicating the setting order of the first grayscale compensation value and the second grayscale compensation value may be omitted in the adjustment information set.

In an embodiment, the first grayscale compensation value and the second grayscale compensation value are mutually opposite numbers, that is, N+M is equal to 0.

Based on the above analysis, the following may be obtained.

The code element "1" corresponds to the grayscale adjustment information set {M; N}, that is, the grayscale value of the pixel point in the image to be displayed is first decreased by M to obtain the grayscale value of the corresponding pixel point in the first image; and the grayscale value of the pixel point in the image to be displayed is then increased by N to obtain the grayscale value of the corresponding pixel point in the second image, so that the grayscale value of the pixel point in the second image frame is higher than the grayscale value of the same pixel point in the first image frame.

The code element "0" corresponds to the grayscale adjustment information set {N; M}, that is, the grayscale value of the pixel point in the image to be displayed is first increased by N to obtain the grayscale value of the corresponding pixel point in the first image; and the grayscale value of the pixel point in the image to be displayed is then decreased by M to obtain the grayscale value of the corresponding pixel point in the second image, so that the grayscale value of the pixel point in the second image frame is lower than the grayscale value of the same pixel point in the first image frame.

In the present embodiment, the display device may sequentially obtain each code element in the binary code stream according to each pixel point in the image frame to be identified; then, obtain the grayscale adjustment information set corresponding to each code element; finally, the display device may adjust the grayscale of the pixel point in the image to be identified corresponding to each code element according to the first grayscale compensation value and the second grayscale compensation value (or the setting order of the first grayscale compensation value and the second grayscale compensation value) for each code element, in order to obtain the first image frame and the second image frame.

For convenience of description, in the embodiment of the present disclosure, the position of the grayscale compensation value in the grayscale adjustment information set that appears first is referred to as the first position, and the position of the grayscale compensation value that appears later is referred to as the second position. For example, the code element "1" corresponds to the grayscale adjustment information set {M; N}, the position of the second grayscale compensation value M is the first position, and the position of the first grayscale compensation value N is the second position. For another example, the code element "0" corresponds to the grayscale adjustment information set {N; M}, the position of the first grayscale compensation value N is the first position, and the position of the second grayscale compensation value M is the second position.

In the present embodiment, the methods for the display device to obtain the first image frame and the second image frame may include:

Method One: the display device may complete the matching of the pixel points and the code elements at one time, thereby obtaining the corresponding relationship between the pixel points and the grayscale adjustment information sets. Then, for each pixel, the display device adjusts the grayscale value of the pixel point using the grayscale compensation value at the first position in each grayscale adjustment information set, i.e., calculating an algebraic sum of the grayscale compensation value and the grayscale value, the algebraic sum being used as the grayscale value of the corresponding pixel point in the first image frame, to finally obtain the first image frame; and then, adjusts the grayscale value of the pixel point using the grayscale compensation value at the second position in each grayscale adjustment information set, i.e., calculating an algebraic sum of the grayscale compensation value and the grayscale value, the algebraic sum being used as the grayscale value of the corresponding pixel point in the second image frame, to finally obtain the second image frame.

Method Two: the display device may match one pixel point with one code element at a time to obtain the corresponding relationship between the pixel points and the grayscale adjustment information sets. For the pixel point, the display device uses the algebraic sum of the grayscale compensation value at the first position in the grayscale adjustment information set and the grayscale value of the pixel point as the grayscale value of the corresponding pixel point in the first image frame; and at the same time, uses the algebraic sum of the grayscale compensation value at the second position in the grayscale adjustment information set and the grayscale value of the pixel point as the grayscale value of the corresponding pixel point in the second image frame. The above process is repeated until the grayscale values of all pixel points in the image frame to be displayed are adjusted to finally obtain the first image frame and the second image frame.

Figure 8:
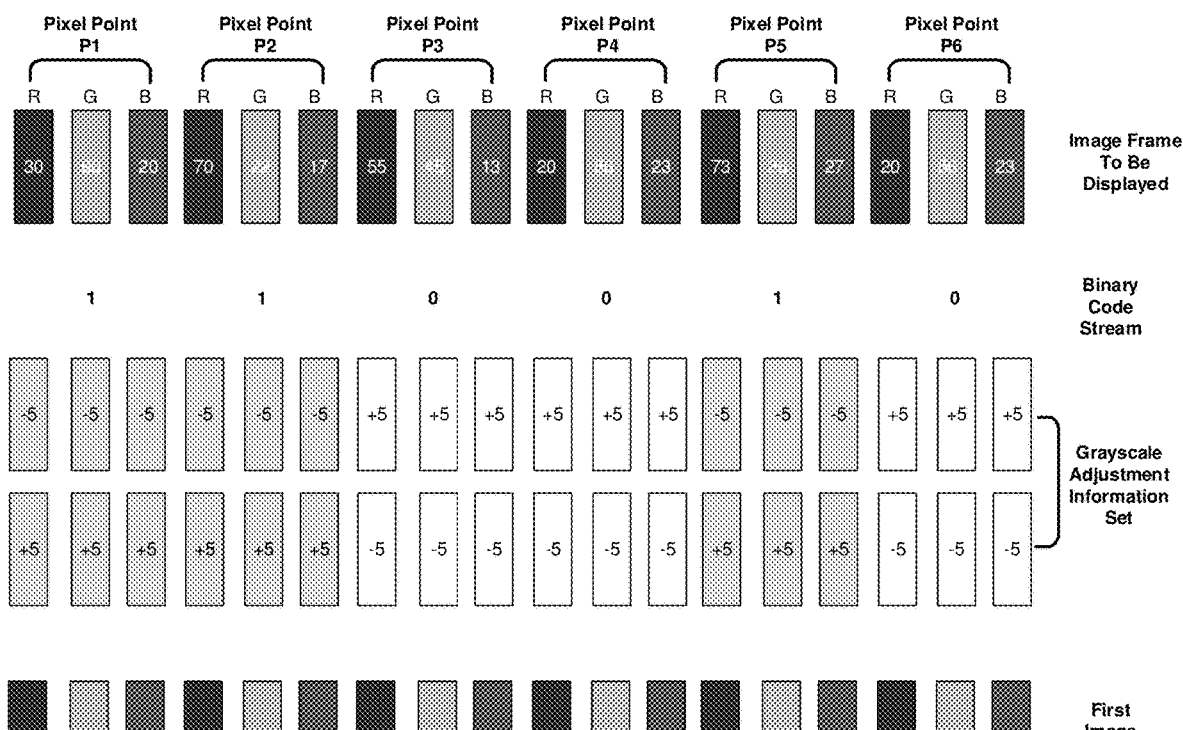
FIG. 8 is a schematic diagram illustrating a corresponding relationship between grayscale adjustment information sets, a first image frame, and a second image frame according to an embodiment of the present disclosure.

Referring to FIG. 8, the display device obtains an image frame to be displayed, including at least pixel points P1~P6. A binary code stream corresponding to the image frame to be displayed is "110010". Therefore, the display device may acquire code elements "1", "1", "0", "0", "1", and "0" corresponding to the pixel points P1~P6 sequentially. Since the code elements "1" and "0" correspond to grayscale adjustment information sets {−5; +5}, {+5; −5} respectively, the display device may acquire grayscale adjustment information sets {−5; +5}, {−5; +5}, {+5; −5}, {+5; −5}, {−5; +5}, and {+5; −5} corresponding to the pixel points respectively.

The display device acquires the first image frame. Taking the first pixel point corresponding to the pixel point P1 as an example, the grayscale values of the sub-pixels RGB are 30, 90, and 20 respectively, the corresponding grayscale compensation values of the first position in the grayscale adjustment information set are −5, −5, and −5, and the algebraic sums are 25, 85, and 15 respectively. That is, the grayscale values of the sub-pixels RGB in the first pixel point of the first image frame are 25, 85, and 15 respectively. The grayscale values of the pixel points in the first image frame corresponding to the pixel points P2~P6 are calculated in the same manner as the first pixel point, so as to obtain the grayscale values of the second to sixth pixel points in the first image frame. Finally, the grayscale values of the first to sixth pixels in the first image frame are {25, 85, 15; 65, 17, 12; 60, 50, 18; 25, 61, 28; 68, 21, 22; 25, 61, 28}.

The display device acquires the second image frame. Taking the first pixel point corresponding to the pixel point P1 as an example, the grayscale values of the sub-pixels RGB are 30, 90, and 20 respectively, the corresponding grayscale compensation values of the second position in the grayscale adjustment information set are +5, +5, and +5, and the algebraic sums are 35, 95, and 25 respectively. That is, the grayscale values of the sub-pixels RGB in the first pixel point in the second image frame are 35, 95, and 25 respectively. The grayscale values of the pixel points in the second image frame corresponding to the pixel points P2~P6 are calculated in the same manner as the first pixel point, so as to obtain the grayscale values of the second to sixth pixel points in the second image frame. Finally, the grayscale values of the first to sixth pixels in the second image frame are {35, 95, 25; 75, 27, 22; 50, 40, 8; 15, 51, 18; 78, 31, 32; 15, 51, 18}.

Figure 9:
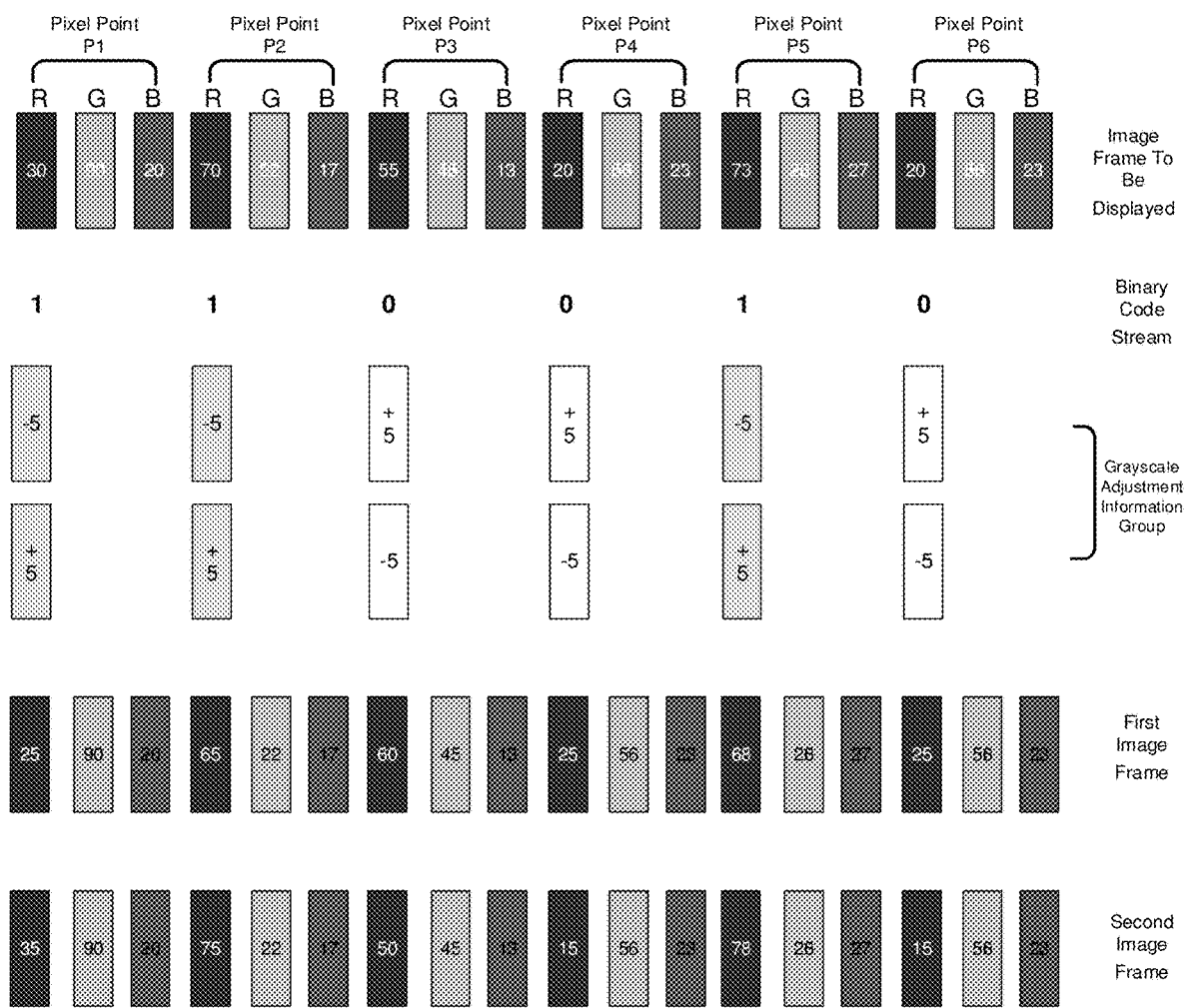
FIG. 9 is a schematic diagram illustrating a corresponding relationship between grayscale adjustment information sets, a first image frame, and a second image frame according to another embodiment of the present disclosure.

Method Three: Method Two describes the case where each pixel point includes three sub-pixels RGB. Of course, the display device may also adjust the grayscale values of one sub-pixel or two sub-pixels in each pixel point, which may also implement the solution of the present disclosure. Referring to FIG. 9, FIG. 9 illustrates a scenario in which the display device adjusts the sub-pixel R in each pixel point in the first image frame and the second image frame. The detailed adjustment process may refer to Method Two, description thereof will not be described herein.

Based on the above content in the previous paragraph, it may be derived that Method Three consists in that if the pixel point includes M1 sub-pixels, the grayscale values of M2 sub-pixels in the M1 sub-pixels may be adjusted, where M1 is a positive integer greater than or equal to 3, and M2 is a positive integer less than or equal to M1.

In practical applications, the grayscales of the pixel points have a certain range of values, such as 0~255. For a case where the grayscale of the pixel point is too smaller or larger, there may be grayscales of some pixel points in the first image frame or the second image frame becoming out of the range of 0~255 due to the process of applying the grayscale compensation values, i.e., called grayscale overflow. For example, if the grayscale of the pixel point in the image frame to be displayed is 3, and the grayscale compensation value is −5, the grayscale of the corresponding pixel point in the first image frame is −2, which is less than the minimum value of 0 in the range of 0~255; for another example, if the grayscale of the pixel in the image frame to be displayed is 254, and the grayscale compensation value is +5, the grayscale of the corresponding pixel in the first image frame is 259, which is greater than the maximum value of 255 in the range of 0~255.

In the present embodiment, the methods for solving the grayscale overflow include:

Method One: the display device may adjust the grayscale of the pixel point in the first image frame or the second image frame for which the grayscale overflow problem occurs to a grayscale closest to the grayscale of the pixel point. For example, if the grayscale of the pixel point in the image frame to be displayed is 3, and the grayscale compensation value is −5, the grayscale of the corresponding pixel point in the first image frame is calculated to be −2. In order to avoid the grayscale overflow, −2 is adjusted to 0. For another example, if the grayscale of the pixel point in the image frame to be displayed is 254, and the grayscale compensation value is +5, the grayscale of the corresponding pixel point in the first image frame is calculated to be 259. In order to avoid the grayscale overflow, 259 is adjusted to 255, so that the first image frame may be displayed normally. In other words, the display device evaluates the magnitude relationship between the algebraic sum of the grayscale of the pixel point in the image frame to be displayed and the grayscale compensation value, and the maximum grayscale value and the minimum grayscale value of the pixel point. When the algebraic sum of the grayscale value is greater than the maximum value of the grayscale value, the display device may determine the maximum grayscale value as the grayscale value of the pixel point. When the algebraic sum of the grayscale value is smaller than the minimum grayscale value, the display device may determine the minimum value of the grayscale value as the grayscale value of the pixel point.

Method Two: the display device may also read a preset grayscale compression formula as given below to compress the grayscale of the pixel point:

$$X_2 = \frac{(255 - (N - M)) * X_1}{255} + N,$$

wherein, N represents the first grayscale compensation value, M represents the second grayscale compensation value, $X_1$ represents an original grayscale value of a pixel point in the image frame to be displayed, and $X_2$ represents a compressed grayscale value of the pixel point in the image frame to be displayed. If there is a decimal in $X_2$, it is rounded up or down.

Taking N=+5 and M=−5 as examples, the compressed grayscale values of the pixel points may be obtained, as shown in Table 1.

TABLE 1

| Original Grayscale Value | Compressed Grayscale Value |
| --- | --- |
| 0 | 5 |
| 20 | 24 |
| 40 | 43 |
| ... | ... |
| 175 | 173 |
| 210 | 207 |
| 255 | 250 |

Similarly, when N=+10 and M=−10, the grayscale values of the pixel points may be compressed to 10~245. When N=+15 and M=−15, the grayscale values of the pixel points may be compressed to 15~240, and so on. Thus, the compressed grayscale values of the pixel points may be obtained even if the first grayscale compensation value and the second grayscale compensation value take different values, which will not be described in detail here.

303. Display the first image frame and the second image frame.

In the present embodiment, the display device displays the first image frame and the second image frame without displaying the image frame to be displayed corresponding to the first image frame and the second image frame.

It may be seen that in the present embodiment, the grayscale values of the first image frame and the second image frame are adjusted in opposite directions, and the grayscale variation amount of each image frame is not large, which may avoid image grayscale distortion. Moreover, based on the visual pause phenomenon, when the grayscale values of the first image frame and the second image frame are adjusted in the opposite directions, the grayscales of the two image frames may be superimposed so that the grayscales are almost unchanged. For example, when the grayscale compensation values of the first image frame and the second image frame are mutually opposite numbers, the result of the superposition is 0 (that is, no grayscale variation), so that the user cannot perceive the grayscale variation of the two image frames, which may ensure the viewing experience of the user. In addition, since the grayscale values of the first image frame and the second image frame are adjusted in the opposite directions, for the terminal, the grayscale difference (grayscale amplitude) of the same pixel point in the first image frame and the second image frame becomes larger, which reduces the difficulty for the terminal to identify the binary code stream, thereby it can implement the visible light communication reliably.

Figure 10:
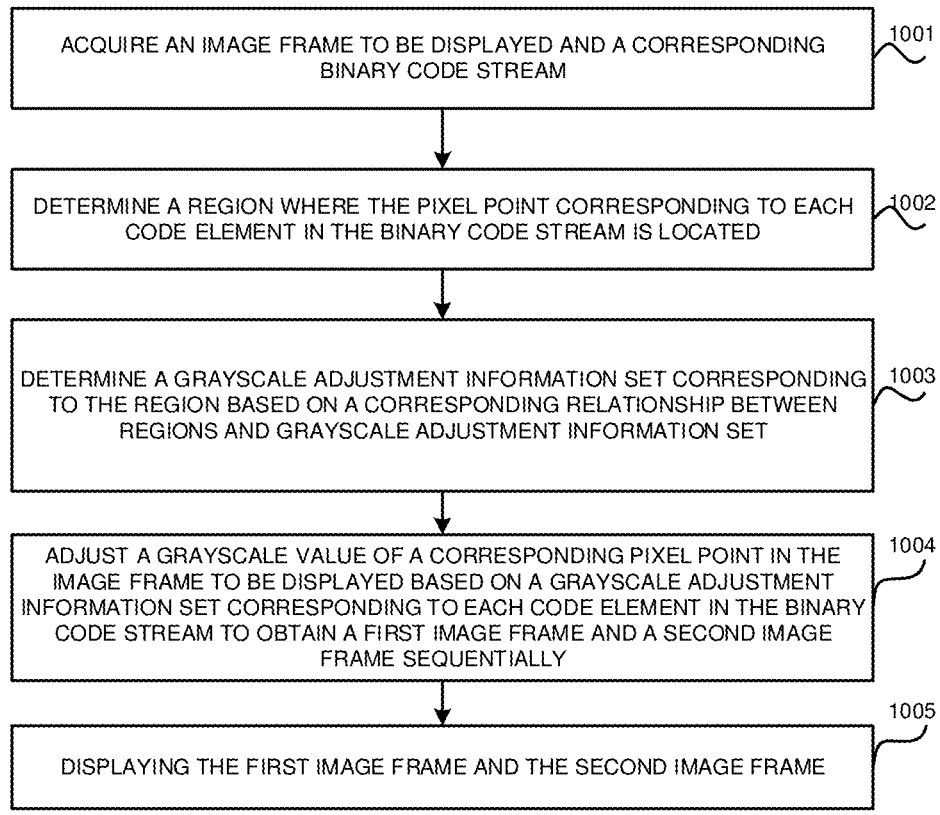
FIG. 10 is a schematic flowchart of another display method according to an embodiment of the present disclosure.

In practical applications, there is a display device with a screen size. In this case, when the terminal takes a picture of the display device, its lens cannot completely cover the screen of the display device. As a result, the terminal cannot obtain a complete binary code stream, and thus cannot display the content of the visible light communication. In order to solve the above problem, an embodiment of the present disclosure further provides a display method. The display device divides the screen into Z regions, where Z is a positive integer. In the visible light communication, each region displays different content, so that the terminal only needs to capture the image frame in one of the regions. FIG. 10 is a schematic flowchart of a display method according to an embodiment of the present disclosure. Referring to FIG. 10, the display method includes the following steps.

1001. Acquire an image frame to be displayed and a corresponding binary code stream.

The step 1001 takes the same methods and criteria as those of the step 301. Detailed description may refer to related content of FIG. 3 and particularly step 301, and will not be repeated here.

1002. Determine a region where the pixel point corresponding to each code element in the binary code stream is located.

Figure 11:
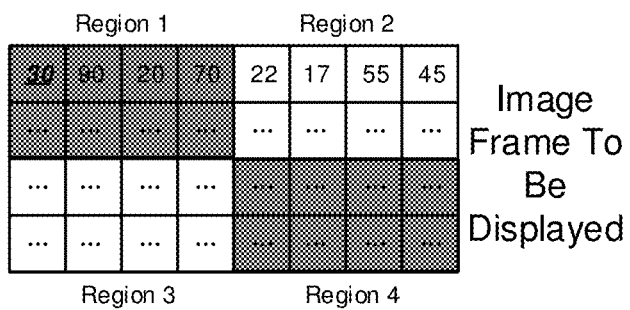
FIG. 11 is a schematic diagram of a region division of an image frame to be displayed according to an embodiment of the present disclosure.

In the present embodiment, the display device may divide the display region into Z regions. Accordingly, the display device may divide the image frame to be displayed into Z regions. Referring to FIG. 11, the display device may divide the image frame to be displayed into four regions, that is, Region 1, Region 2, Region 3, and Region 4. It should be noted that even if the image frame to be displayed is divided into Z regions, when the image frame is displayed on the screen of the display device, the user may still view a complete image frame.

Figure 12:
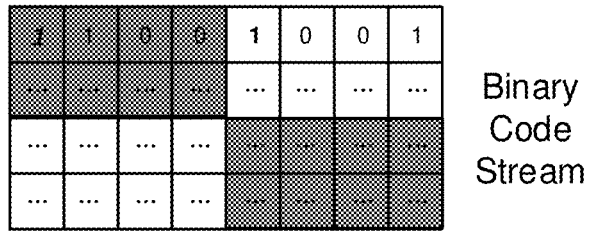
FIG. 12 is a schematic diagram of a region division of a binary code stream according to an embodiment of the present disclosure.

In the present embodiment, since the binary code stream corresponds to pixels in the image frame to be displayed (the corresponding relationship may refer to the description of step 302), the position of the pixel point corresponding to the code element may be determined based on the position of the code element in the binary code stream. Then, the region where the pixel point is located may be obtained based on the position of the pixel point in the image frame to be displayed, the region where a pixel point corresponding to a code element being one of the Z regions. Referring to FIGS. 11 and 12, the code element at the first row and the first column in the binary code stream correspond to the pixel point at the first row and the first column in the image frame to be displayed, and the pixel point at the first row and the first column is located in Region 1.

1003. Determine a grayscale adjustment information set corresponding to the region as the grayscale adjustment information set corresponding to the code element, based on a corresponding relationship between regions and grayscale adjustment information sets.

In order to distinguish the first grayscale compensation values N corresponding to different regions, a subscript x is added to the first grayscale compensation value N, where the value range of x is [1, Z], Z is the number of regions divided in the image frame to be displayed, $N_x$ represents the first grayscale compensation value corresponding to the x-th region; similarly, $M_x$ represents the second grayscale compensation value corresponding to the x-th region.

In the present embodiment, different regions in the same image frame to be displayed correspond to different grayscale adjustment information sets. The corresponding relationship between regions and grayscale adjustment information sets is shown in Table 2.

TABLE 2

|  | Grayscale Adjustment Information Set |
| --- | --- |
| Region 1 | {$N_1$; $M_1$} |
| Region 2 | {$N_2$; $M_2$} |
| Region 3 | {$N_3$; $M_3$} |
| Region 4 | {$N_4$; $M_4$} |

It should be noted that in the present embodiment, the first grayscale compensation values in the grayscale adjustment information sets corresponding to different regions in the same image frame to be displayed are different, and/or the second grayscale compensation values in the grayscale adjustment information sets corresponding to different regions in the image frame to be displayed are different.

In an embodiment, the first grayscale compensation value corresponding to the same region is a positive number, and the second grayscale compensation value corresponding to the same region is a negative number. In another embodiment, the first grayscale compensation value and the second grayscale compensation value corresponding to the same region are mutually opposite numbers.

1004. Adjust the grayscale value of the corresponding pixel point in the image frame to be displayed based on the grayscale adjustment information set corresponding to each code element in the binary code stream to obtain the first image frame and the second image frame sequentially.

The step 1004 takes the same methods and criteria as those of the step 302. Detailed description may refer to related content of FIG. 3 and particularly step 302, and will not be repeated here.

Figure 13:
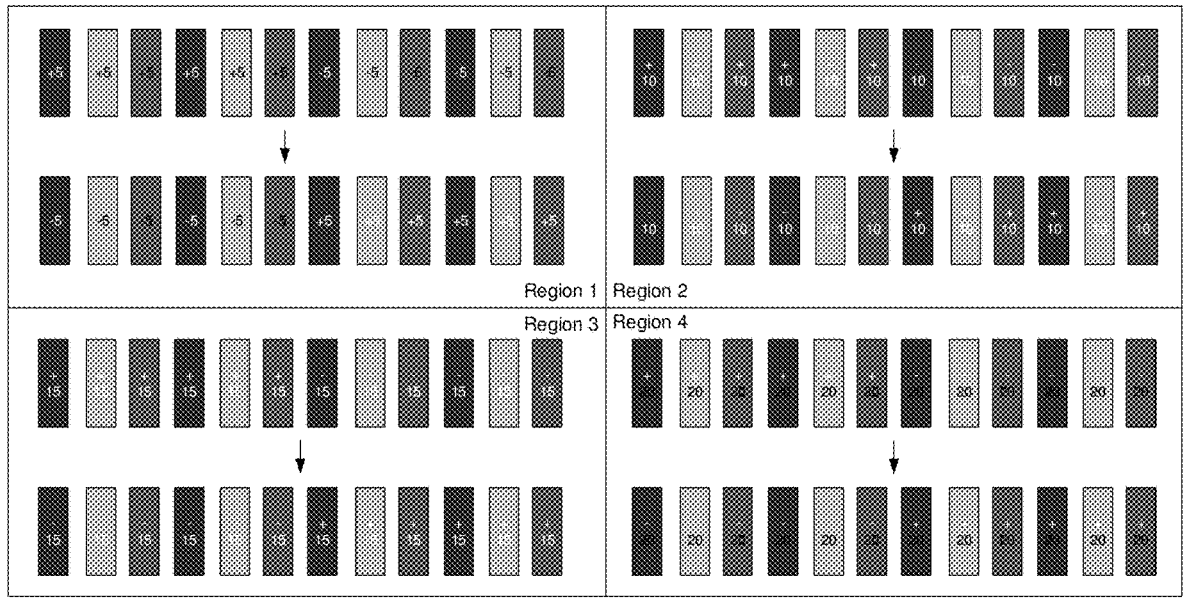
FIG. 13 is a schematic diagram of a region division of a first image frame and a second image frame according to an embodiment of the present disclosure.

For example, $N_1=+5$, $M_1=-5$; $N_2=+10$, $M_2=-10$; $N_3=+15$, $M_3=-15$; $N_4=+20$, and $M_4=-20$. Referring to FIG. 13, the grayscale amplitude of the first image frame and the second image frame in Region 1 is +10 or −10; the grayscale amplitude of the first image frame and the second image frame in Region 2 is +20 or −20; the grayscale amplitude of the first image frame and the second image frame in Region 3 is +30 or −30; and the grayscale amplitude of the first image frame and the second image frame in Region 4 is +40 or −40.

1005. Display the first image frame and the second image frame.

The step 1005 takes the same methods and criteria as those of the step 303. Detailed description may refer to related content of FIG. 3 and particularly step 303, and will not be repeated here.

Thus, the display device in the present embodiment divides the image frame to be displayed into regions, and may display different content in different regions during the visible light communication, thereby achieving multiple data output and improving transmission efficiency. At the same time, the present embodiment may also enable the lens of the terminal to cover a certain region without affecting content viewing, which improves the viewing experience of the user.

Figure 14:
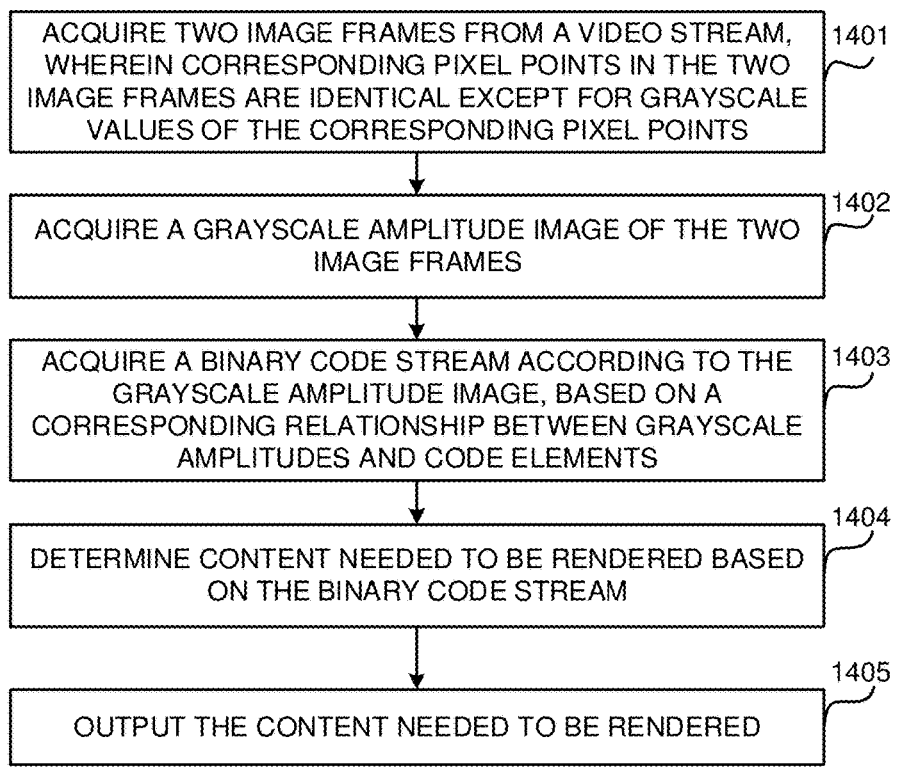
FIG. 14 is a schematic flowchart of a visible light communication transmission method according to an embodiment of the present disclosure.

For the application scenario as shown in FIG. 1, an embodiment of the present disclosure provides a visible light communication transmission method. FIG. 14 is a schematic flowchart of a visible light communication transmission method according to the embodiment of the present disclosure. The visible light communication transmission method is applicable to electronic devices with cameras, such as a server, a display device, a mobile terminal, etc. For ease of description, the mobile terminal is used as an example for description in the subsequent embodiments. Referring to FIG. 14, the visible light communication transmission method includes the following steps.

1401. Acquire two image frames from a video stream, wherein corresponding pixel points in the two image frames are identical except for grayscale values of the corresponding pixel points.

In the present embodiment, the user may capture pictures displayed on the display device 11 by a terminal 12 to obtain a video stream; or the user may record the pictures displayed on the display device 11 by the terminal 12 to obtain the video stream; or the user may acquire the video stream by the terminal 12 via a network connected to the display device 11. The skilled in the art may select a suitable video stream acquisition way according to a particular scenario, which is not limited herein.

Then, the terminal obtains, from the video stream, two image frames (that is, the first image frame and the second image frame) by applying grayscale variations to the same image frame to be displayed.

It may be understood that after two image frames (for example, the first frame and the second frame) are acquired, the terminal may determine whether the same pixel point in both the first frame and the second frame are identical except for grayscale values of the pixel point. If so, the first frame and the second frame are the first image frame and the second image frame; if not, the terminal continuously acquires another one image frame (that is, the third frame), and evaluates data of the third frame and the second frame.

Generally, the second frame and the third frame are the first image frame and the second image frame. Of course, if the third frame and the second frame still do not meet the requirements, the terminal acquires the fourth frame, and evaluates the fourth frame and the third frame, and so on, until the required first image frame and the second image frame are obtained.

1402. Acquire a grayscale amplitude image from the two image frames.

Figure 15:
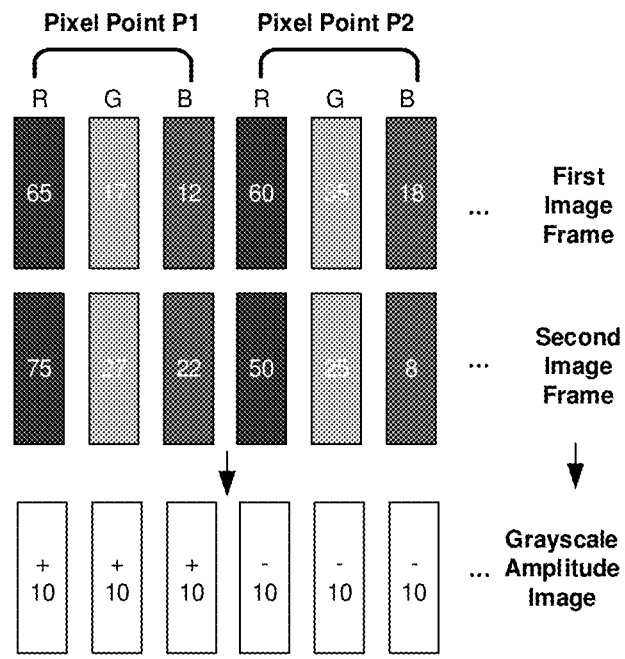
FIG. 15 is a schematic diagram of acquiring a grayscale amplitude image based on a first image frame and a second image frame according to an embodiment of the present disclosure.

In the present embodiment, the terminal acquires the grayscale amplitude image according to the first image frame and the second image frame. Referring to FIG. 15, the terminal subtracts the grayscale value of each pixel point in the first image frame from the grayscale value of the same pixel point in the second image frame to obtain the grayscale amplitude corresponding to the pixel point. This process is repeated, and after the grayscale amplitudes corresponding to all the pixel points have been acquired, the grayscale amplitude image may be obtained.

It may be understood that the terminal may output after obtaining grayscale amplitudes of a group of pixel points; or may output after obtaining a row or a column of grayscale amplitudes of the grayscale amplitude image; or may output after obtaining the complete grayscale amplitude image.

It may be understood that since the grayscale amplitude between the first image frame and the second image frame is known, the terminal may also use the obtained grayscale amplitude image to determine whether the two image frames sequentially obtained from the video stream are generated based on the same image frame to be displayed. If the grayscale amplitudes of the pixels in the grayscale amplitude image are the same, the two image frames are generated based on the same image frame to be displayed, and then the process proceeds to step 1403; if not, the process returns to step 1401.

It should be noted that in the present embodiment, a sub-pixel of each pixel corresponds to one code element. Of course, the skilled in the art may also adjust the corresponding relationship between code elements and sub-pixels. For example, one code element corresponds to 2 or 3 sub-pixels in one pixel point. When one code element corresponds to more than two sub-pixels, the gray-scale amplitude may be calculated by using the first of the two or more sub-pixels as a reference, and the gray-scale amplitudes of the remaining sub-pixels are used to verify the grayscale amplitude corresponding to the first sub-pixel. When all or most (more than 50%) of the two or more sub-pixels have the same grayscale amplitude, it illustrates that the grayscale amplitude obtained this time is correct.

It should be noted that since the grayscale amplitude image is only intermediate data of the visible light communication, it is not necessary to be displayed on the terminal.

1403. Acquire a binary code stream according to the grayscale amplitude image, based on a corresponding relationship between grayscale amplitudes and code elements.

In the present embodiment, the corresponding relationship between grayscale amplitudes and code elements may be as the following: referring to FIG. 6, the code element "1" corresponds to the case where the grayscale value of the pixel point in the second image frame is higher than the grayscale value of the same pixel point in the first image frame, that is, the grayscale difference value is a positive number; referring to FIG. 7, the code element "0" corresponds to the case where the grayscale value of the pixel point in the second image frame is lower than the grayscale value of the same pixel point in the first image frame, that is, the grayscale difference value is a negative number.

Figure 16:
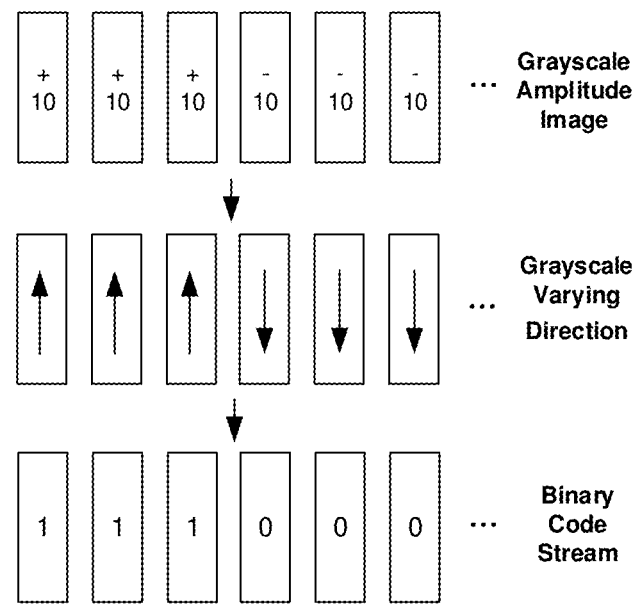
FIG. 16 is a schematic diagram of acquiring a binary code stream based on a grayscale amplitude image according to an embodiment of the present disclosure.

In the present embodiment, referring to FIG. 16, based on the corresponding relationship between grayscale amplitudes and code elements, the terminal may obtain the binary code stream according to the grayscale amplitude image. In FIG. 16, the first row represents the grayscale amplitude image, the second row represents the grayscale varying direction, the upward arrow indicates that the grayscale value of the pixel point in the second image frame is greater than the grayscale value of the same pixel point in the first image frame, and the grayscale difference value is a positive number; the downward arrow indicates that the grayscale value of the pixel point in the second image frame is smaller than the grayscale value of the same pixel point in the first image frame, and the grayscale difference value is a positive number; and the third row indicates the binary code stream determined according to the grayscale variation of the second row.

1404. Determine content needed to be rendered based on the binary code stream.

In the present embodiment, based on a preset conversion algorithm, the terminal converts the binary code stream into the corresponding content, such as text, images, etc., so as to determine the content to be rendered. The conversion algorithm may be implemented by any conversion algorithm in related technologies, which is not limited herein.

1405. Output the content to be rendered.

In the present embodiment, the terminal outputs and displays the content to be rendered on the screen.

Thus, in the present embodiment, the terminal may acquire the first image frame and the second image frame in the video stream rendered by the display device, obtain the grayscale amplitude image by using the grayscale values of the same pixel point in the first image frame and the second image frame, and then determine the binary code stream and the content needed to be rendered from the grayscale amplitude image. It may be seen that in the present embodiment, the terminal may complete the visible light communication with the display device, which may improve the display efficiency and the data transmission efficiency. In addition, the grayscale values of the same pixel point are adjusted in the opposite directions, so that the grayscale difference of the same pixel point in the first image frame and the second image frame becomes larger, which is beneficial to expand the grayscale amplitude, thereby reducing the difficulty for the terminal to identify the binary code stream, and enabling the reliable visible light communication.

Figure 17:
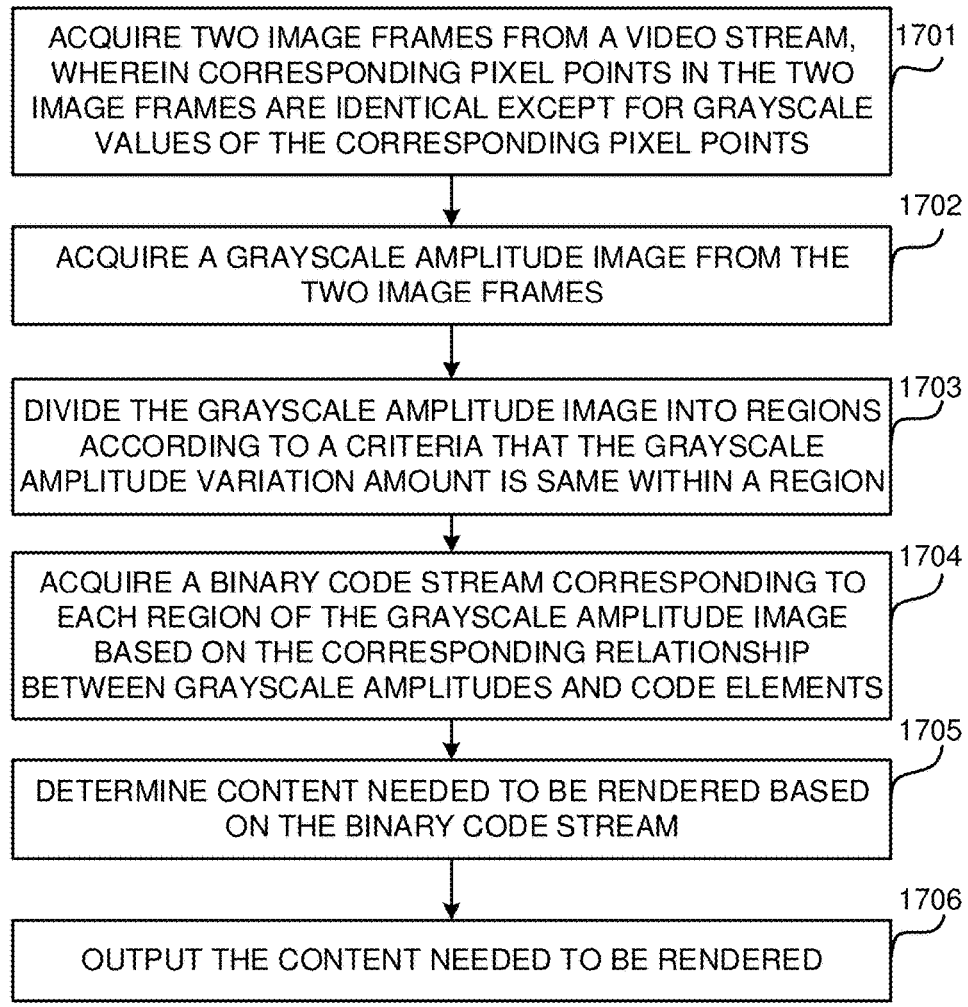
FIG. 17 is a schematic flowchart of another visible light communication transmission method according to an embodiment of the present disclosure.

For the application scenario shown in FIG. 1, an embodiment of the present disclosure provides a visible light communication transmission method. FIG. 17 is a schematic flowchart of a visible light communication transmission method according to an embodiment of the present disclosure. The visible light communication transmission method is applicable to electronic devices with cameras, such as a server, a display device, and a mobile terminal, etc. For ease of description, the mobile terminal is used as an example for description in the subsequent embodiments. Referring to FIG. 17, a visible light communication transmission method includes the following steps.

1701. Acquire two image frames from a video stream, wherein corresponding pixel points in the two image frames are identical except for grayscale values of the corresponding pixel points.

The step 1701 takes the same methods and criteria as those of the step 1401. Detailed description may refer to related content of FIG. 14 and particularly step 1401, and will not be repeated here.

1702. Acquire a grayscale amplitude image from the two image frames.

The step 1702 takes the same methods and criteria as those of the step 1402. Detailed description may refer to related content of FIG. 14 and particularly step 1402, and will not be repeated here.

Figure 18:
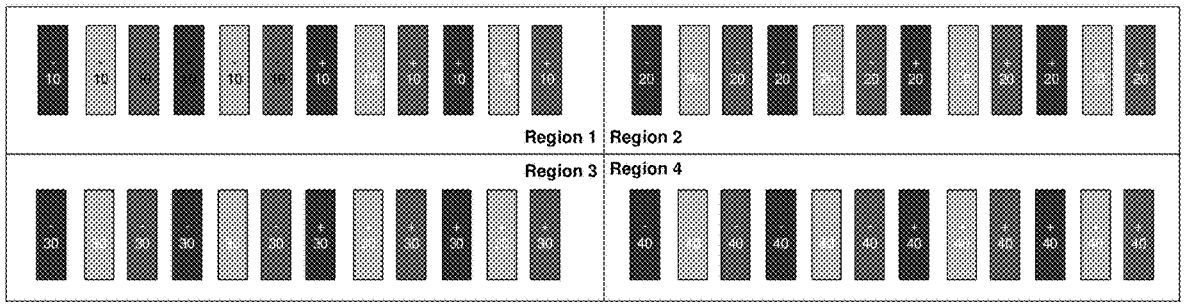
FIG. 18 is a schematic diagram of dividing a grayscale amplitude image into regions based on a grayscale amplitude variation amount according to an embodiment of the present disclosure.

In the present embodiment, taking the first image frame and the second image frame shown in FIG. 13 as an example, a grayscale amplitude image shown in FIG. 18 may be obtained.

1703. Divide the grayscale amplitude image into Z regions according to a criterion that the grayscale amplitude variation amount is the same within a region, where Z is a positive integer.

In the present embodiment, referring to FIG. 18, the terminal may determine that the grayscale amplitude variation amount of the first to fourth pixel points of the first row is 10 (grayscales), and the grayscale amplitude variation amount of the fifth to eighth pixel points of the first row is 20 (grayscales), the grayscale amplitude variation amount of the first to fourth pixel points of the second row is 30 (grayscales), and the grayscale amplitude variation amount of the fifth to eighth pixel points of the second row is 40 (grayscales).

Therefore, the terminal may divide the grayscale amplitude image shown in FIG. 18 into four regions according to a criterion that the grayscale amplitude variation amount is the same within a region:

Region 1 covering the first to fourth pixel points in the first row;

Region 2 covering the fifth to eighth pixel points in the first row;

Region 3 covering the first to fourth pixel points in the second row;

Region 4 covering the fifth to eighth pixel points in the second row.

1704. Acquire a binary code stream corresponding to at least one of the Z regions of the grayscale amplitude image, based on the corresponding relationship between grayscale amplitudes and code elements.

The step 1704 takes the same methods and criteria as those of the step 1403. Detailed description may refer to related content of FIG. 14 and particularly step 1403, and will not be repeated here.

It should be noted that the terminal processes the entire grayscale amplitude image in step 1403, while the terminal processes each region of the grayscale amplitude image in step 1704, that is, the terminal further needs to determine which region in the grayscale amplitude image it processes in step 1704.

In an embodiment, the terminal may acquire the regions in such a way that the terminal may acquire historical data stored locally; then determine, based on the historical data, behavior preference characteristics of a target object using the terminal, such as clothes, prices, styles, etc.; and determine a region corresponding to the behavior preference characteristics based on a corresponding relationship between behavior preference characteristics and grayscale amplitudes. In this way, the terminal may determine a corresponding region and obtain the binary code stream of the region.

1705. Determine content needed to be rendered based on the binary code stream.

The step 1705 takes the same methods and criteria as those of the step 1404. Detailed description may refer to related content of FIG. 14 and particularly step 1404, and will not be repeated here.

1706. Output the content needed to be rendered.

The step 1706 takes the same methods and criteria as those of the step 1405. Detailed description may refer to related content of FIG. 14 and particularly step 1405, and will not be repeated here.

Figure 19:
FIG. 19 is a schematic diagram of an application scenario in which different contents of visible light communication are carried in different regions in a first image frame and a second image frame according to an embodiment of the disclosure.

When the user takes a picture with a mobile phone, the picture captured by the mobile phone's camera cannot completely cover the entire screen of the display device, especially the billboard at the subway station, the display board at the exhibition, etc. Here, the display device may rich the displayed information by achieving multiple data output in regions. FIG. 19 is an application scenario diagram of a visible light communication transmission method according to an embodiment of the present disclosure.

The family contains a plurality of family members. When information is transmitted by the visible light communication, it is sometimes necessary to distinguish between different members. Referring to FIG. 19, when watching the same movie, female users are interested in the clothes in the movie, while male users are interested in the tourist attractions in the movie, which may be set in advance by the terminal, e.g., selecting the regions of interest of the user in advance, or allowing the terminal to extract the user's mobile phone usage behavior (that is, behavior preference characteristics), such as the user's search history, shopping history, etc., to form big data storage and perform analysis thereon, intelligently and automatically determine the user's behavioral interest. Under the premise of data transmission in regions, the screen of the display device may output a plurality of types of information at the same time.

The terminal may automatically determine the information required by the user. Continuing to refer to FIG. 19, there are three types of information ABC transmitted by the display at the same time, which are respectively displayed on Region 1 (corresponding to cosmetics), Region 2 (corresponding to clothes), and Region 3 (corresponding to shoes). After the user records by the terminal camera and performs screening, only the information required by the user may be selected for decoding, or a plurality of channels of information may be output. The terminal may then display to the user directly, or prompt the user with a slow flash or in another form, and the user may choose whether to open it or not autonomously.

In order to improve confidentiality, one or more channels of information in the content transmitted by the display device are confidential. Only certain groups of people have rights for viewing. For example, when the simultaneously output information contains tobacco and alcohol sales information, parents need to protect the minors. In this case, underage protection may be enabled on the terminal. In this way, when the terminal does not have the right to decode or the decoded information contains content related to tobacco and alcohol, the content may be selectively skipped based on user's setting.

It may be seen that in the present embodiment, the decoding of useless information may be avoided, which saves time, reduces unnecessary information storage, increases computing speed, and achieves a better user experience.

Figure 20:
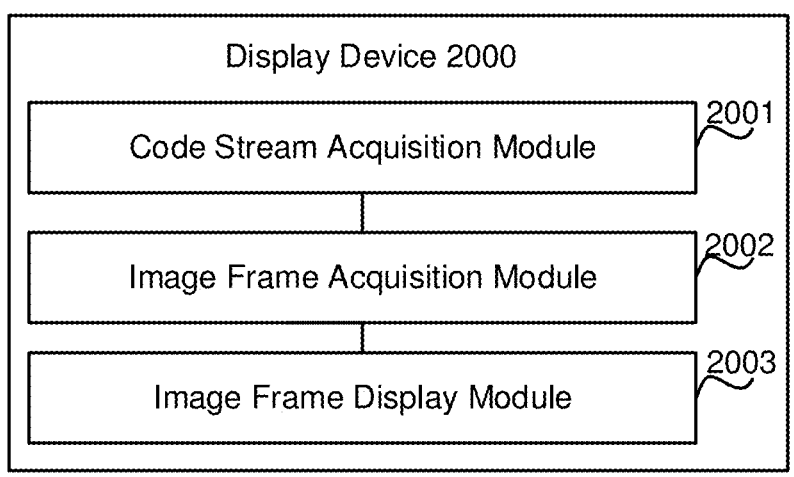
FIGS. 20 to 25 are block diagrams of a display device according to an embodiment of the present disclosure.

According to a third aspect of the embodiments of the present disclosure, a display device is provided. FIG. 20 is a block diagram of a display device according to an embodiment of the present disclosure. Referring to FIG. 20, a display device 2000 includes:

a code stream acquisition module 2001, configured to acquire an image frame to be displayed and a corresponding binary code stream;

an image frame acquisition module 2002, configured to adjust a grayscale value of a corresponding pixel point in the image frame to be displayed based on a grayscale adjustment information set corresponding to each code element in the binary code stream, to obtain a first image frame and a second image frame that are different from the image frame to be displayed; and an image frame display module 2003, configured to display the first image frame and the second image frame.

Figure 21:
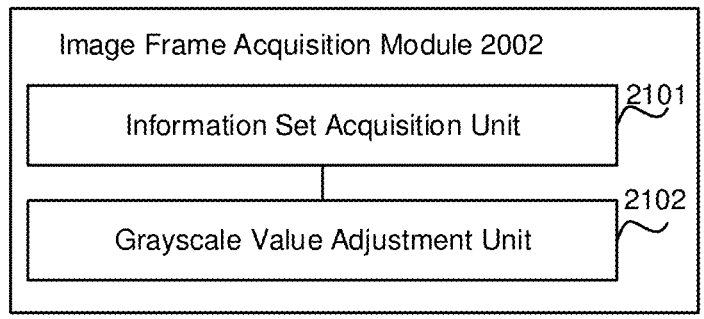

An embodiment of the present disclosure further provides a display device. FIG. 21 is a block diagram of a display device according to an embodiment of the present disclosure. Referring to FIG. 21, on the basis of the display device 2000 shown in FIG. 20, the image frame acquisition module 2002 includes:

an information set acquisition unit 2101, configured to acquire the grayscale adjustment information set corresponding to each code element, the grayscale adjustment information set including a first grayscale compensation value and a second grayscale compensation value; and a grayscale value adjustment unit 2102, configured to adjust the grayscale value of each pixel point in the image frame to be displayed according to the first grayscale compensation value to obtain the first image frame, and adjusting the grayscale value of each pixel point in the image frame to be displayed according to the second grayscale compensation value to obtain the second image frame.

Figure 22:
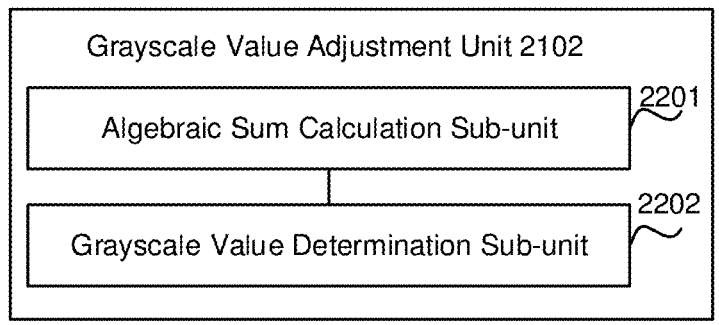

An embodiment of the present disclosure further provides a display device. FIG. 22 is a block diagram of a display device according to an embodiment of the present disclosure. Referring to FIG. 22, on the basis of the display device 2000 as shown in FIG. 21, the grayscale value adjustment unit 2102 includes:

an algebraic sum calculation sub-unit 2201, configured to calculate, for each pixel point in the image frame to be displayed, an algebraic sum of the grayscale value of the pixel point and the first grayscale compensation value;

a grayscale value determination sub-unit 2202, configured to determine the algebraic sum as a grayscale value of the corresponding pixel point in the first image frame;

or, the algebraic sum calculation sub-unit 2201, further configured to calculate, for each pixel point in the image frame to be displayed, an algebraic sum of the grayscale value of each pixel point and the second grayscale compensation value;

the grayscale value determination sub-unit 2202, further configured to determine the algebraic sum as a grayscale value of the corresponding pixel point in the second image frame.

Figure 23:
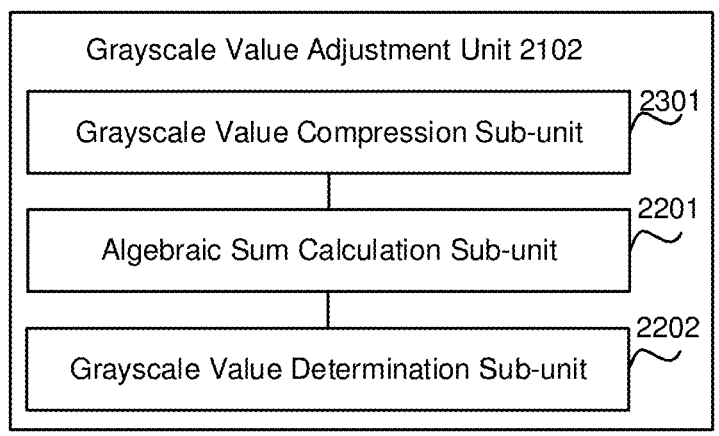

An embodiment of the present disclosure further provides a display device. FIG. 23 is a block diagram of a display device according to an embodiment of the present disclosure. Referring to FIG. 23, on the basis of the display device 2000 as shown in FIG. 22, the grayscale value adjustment unit 2102 further includes:

a grayscale value compression sub-unit 2301, configured to compress the grayscale of each pixel point in the image frame to be displayed according to a preset grayscale compression formula.

Figure 24:
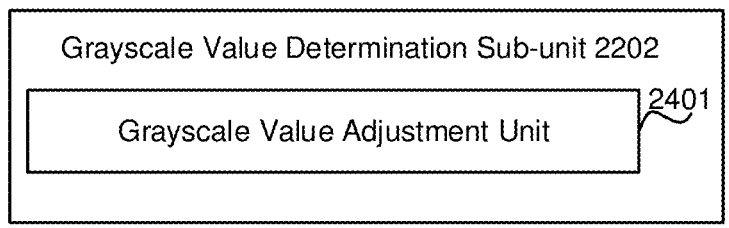

An embodiment of the present disclosure further provides a display device. FIG. 24 is a block diagram of a display device according to an embodiment of the present disclosure. Referring to FIG. 24, on the basis of the display device 2000 as shown in FIG. 20, the grayscale value determination subunit 2202 includes:

a grayscale value adjustment unit 2401, configured to, if the pixel point includes $M_1$ sub-pixels, adjust grayscale values of $M_2$ sub-pixels in the $M_1$ sub-pixels, where $M_1$ is a positive integer greater than or equal to 3, and $M_2$ is a positive integer less than or equal to $M_1$.

Figure 25:
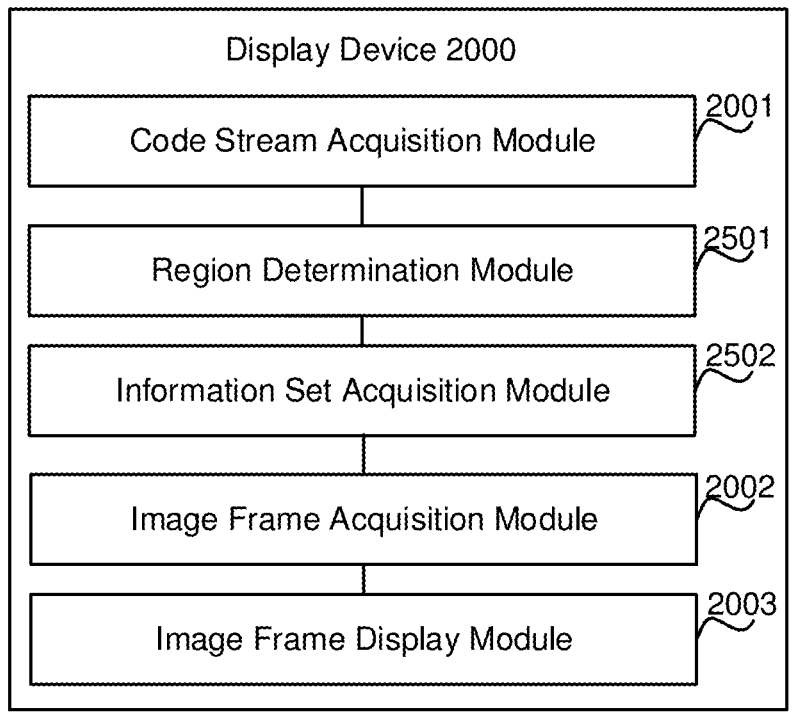

Alternatively, when the image frame to be displayed is divided into Z regions, and Z is a positive integer, an embodiment of the present disclosure further provides a display device. FIG. 25 is a block diagram of a display device according to an embodiment of the present disclosure. Referring to FIG. 25, on the basis of the display device 2000 as shown in FIG. 20, the display device 2000 includes:

an region determination module 2501, configured to determine a region where the pixel point corresponding to each code element in the binary code stream is located, the region where the pixel point corresponding to each code element is located being one of the Z regions;

an information set acquisition module 2502, configured to determine a grayscale adjustment information set corresponding to the region as the grayscale adjustment information set corresponding to the code element, based on a corresponding relationship between regions and grayscale adjustment information sets.

In an embodiment, the first grayscale compensation values in the grayscale adjustment information sets corresponding to different regions in the image frame to be displayed are different, and/or the second grayscale compensation values in the grayscale adjustment information sets corresponding to different regions in the image frame to be displayed are different.

In an embodiment, the first grayscale compensation value is a positive number, and the second grayscale compensation value is a negative number.

In an embodiment, the first grayscale compensation value and the second grayscale compensation value are mutually opposite numbers.

Figure 26:
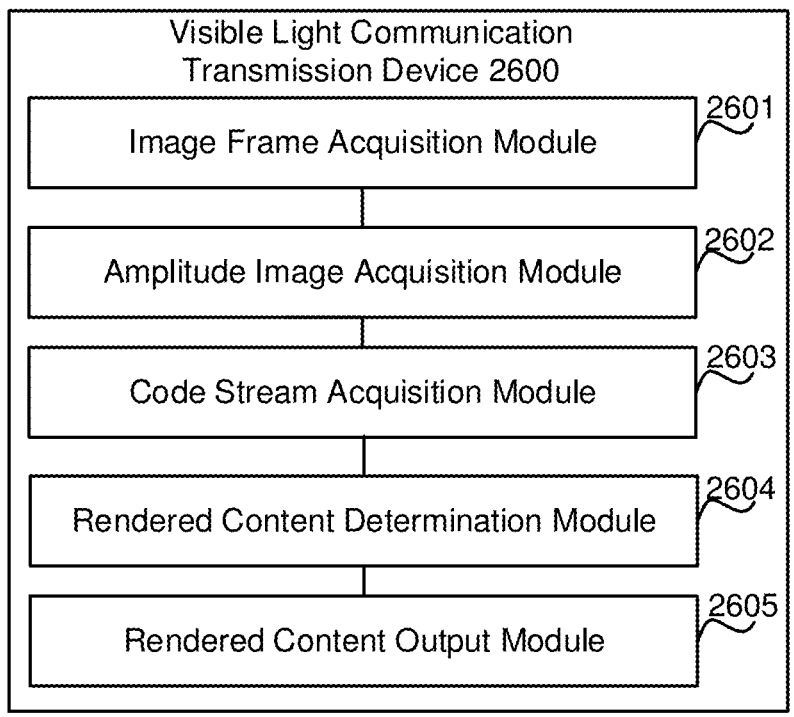
FIGS. 26 to 28 are block diagrams of a visible light communication transmission device according to an embodiment of the present disclosure.

According to a fourth aspect of the embodiments of the present disclosure, a visible light communication transmission device is provided. FIG. 26 is a block diagram of a visible light communication transmission device according to an embodiment of the present disclosure. Referring to FIG. 26, a visible light communication transmission device 2600 includes:

an image frame acquisition module 2601, configured to acquire two image frames from a video stream, wherein corresponding pixel points in the two image frames are identical except for grayscale values of the corresponding pixel points;

an amplitude image acquisition module 2602, configured to acquire a grayscale amplitude image from the two image frames;

a code stream acquisition module 2603, configured to acquire a binary code stream according to the grayscale amplitude image based on a corresponding relationship between grayscale amplitudes and code elements;

a rendered content determination module 2604, configured to determine content needed to be rendered based on the binary code stream; and a rendered content output module 2605, configured to output the content needed to be rendered.

Figure 27:
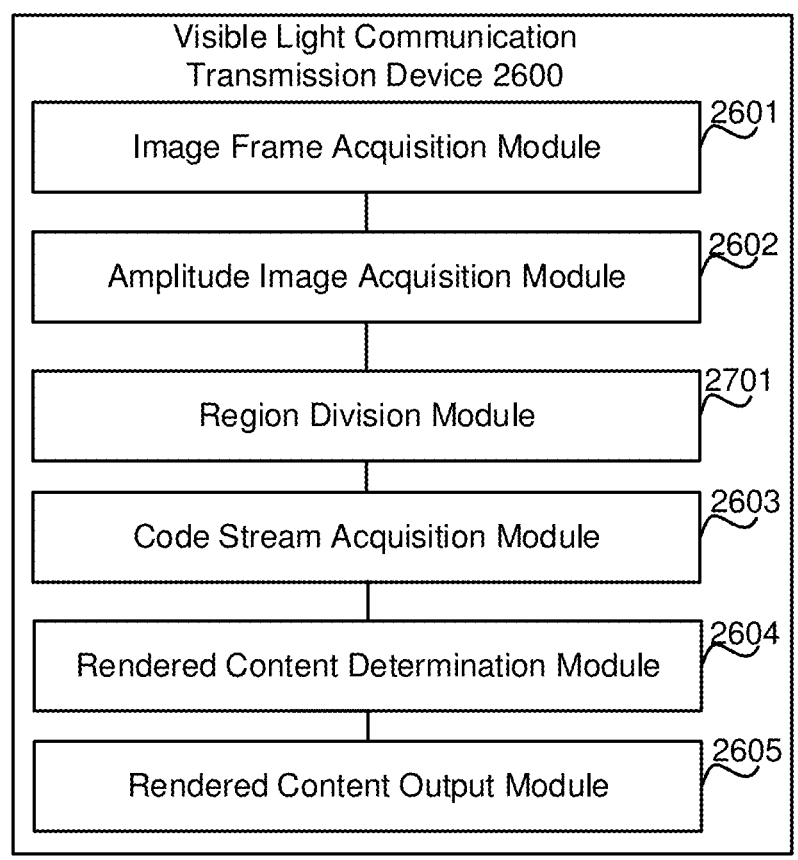

An embodiment of the present disclosure further provides a visible light communication transmission device. FIG. 27 is a block diagram of a visible light communication transmission device according to an embodiment of the present disclosure. Referring to FIG. 27, on the basis of the visible light communication transmission device 2600 as shown in FIG. 26, the visible light communication transmission device 2600 includes:

a region division module 2701, configured to divide the grayscale amplitude image into Z regions according to a criterion that the grayscale amplitude variation amount is the same within a region;

wherein the code stream acquisition module 2603 is further configured to acquire a binary code stream corresponding to at least one of the Z regions of the grayscale amplitude image, based on the corresponding relationship between grayscale amplitudes and code elements.

Figure 28:
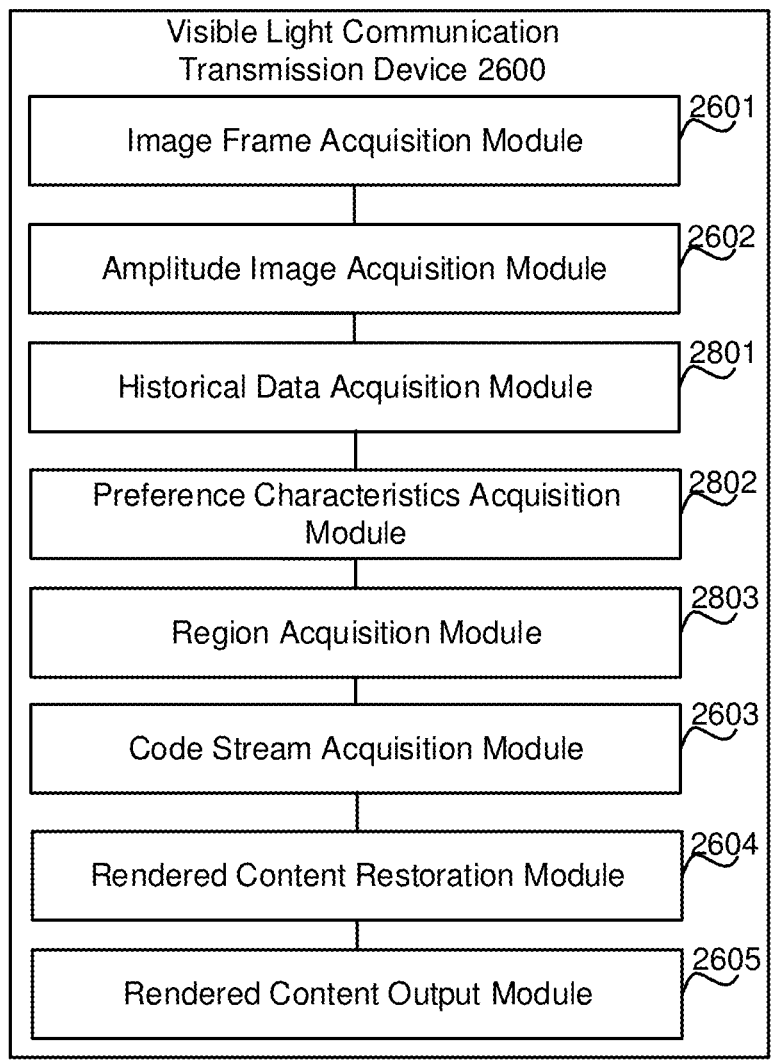

An embodiment of the present disclosure further provides a visible light communication transmission device. FIG. 28 is a block diagram of a visible light communication transmission device according to an embodiment of the present disclosure. Referring to FIG. 28, on the basis of the visible light communication transmission device 2600 as shown in FIG. 26, the visible light communication transmission device 2600 further includes:

a historical data acquisition module 2801, configured to acquire historical data stored locally;

a preference characteristics acquisition module 2802, configured to determine behavior preference characteristics of a target object based on the historical data;

a region acquisition module 2803, configured to determine a region corresponding to the behavior preference characteristics based on a corresponding relationship between behavior preference characteristics and grayscale amplitudes;

wherein the code stream acquisition module 2603 is further configured to acquire a binary code stream of the region of the grayscale amplitude image corresponding to the behavior preference characteristics.

Figure 29:
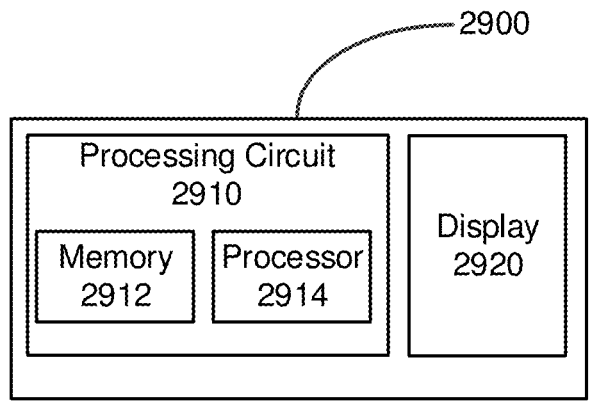
FIG. 29 is a schematic block diagram of an embodiment of a device according to the present disclosure.

FIG. 29 is a schematic block diagram of a device 2900 according to an embodiment of the present disclosure. The display device 2900 includes a processing circuit 2910. In some embodiments, the processing circuit may include a memory 2912 and a processor 2914. The processing circuit may be configured to perform one or more functions as described in the present disclosure. In addition to conventional processors and memories, the processing circuit 2910 may include integrated circuits for processing and/or control, such as one or more processors and/or processor cores and/or FPGAs (field programmable gate arrays) and/or ASICs (Application Specific Integrated Circuits).

The processing circuit 2910 may include and/or be connected to and/or be configured to access (e.g., write and/or read) the memory 2912, which may include any type of volatile and/or non-volatile memory, e.g., cache and/or buffer memory and/or RAM (random access memory) and/ or ROM (read only memory) and/or optical memory and/or EPROM (erasable programmable read only memory). Such a memory 2912 may be configured to store computer program code executable by the processor 2914 and/or other data, such as the corresponding relationship between code elements and grayscale adjustment information sets, the corresponding relationship between regions and grayscale adjustment information sets, etc. The processing circuit 2910 may be configured to control any method described in the present disclosure and/or cause such a method to be performed by, e.g., the processor 2914. Corresponding computer program codes may be stored in the memory 2912, which may be readable and/or readablely connected to the processing circuit 2910. In other words, the processing circuit 2910 may include a controller, which may include a microprocessor and/or a microcontroller and/or an FPGA (Field Programmable Gate Array) device and/or an ASIC (Application Specific Integrated Circuit) device. It may be considered that the processing circuit 2910 includes or may be connected to or capable of being connected to the memory 2912 that may be adapted to be accessible by the controller and/or the processing circuit 2910 for reading and/or writing.

According to an embodiment of the present disclosure, the processor 2914 may execute the computer program codes stored in the memory 2912 to perform the steps of the display methods as shown in FIGS. 1~16 according to the embodiments of the present disclosure. At this time, the device 2900 functions as a display device.

According to an embodiment of the present disclosure, the processor 2914 may execute the computer program codes stored in the memory 2912 to execute the steps of the visible light communication transmission method as shown in FIGS. 17~19 according to the embodiments of the present disclosure. At this time, the device 2900 functions as a visible light communication transmission device.

According to an embodiment of the present disclosure, the device 2900 may further include, e.g., a display 2920 for displaying according to the control of the processing circuit 2910. For example, when the device 2900 is operated as a display device, the display 2920 is operable to display the first image frame and the second image frame.

As realized by the skilled in the art, the concepts described herein may be embodied as a method, an information processing system, and/or a computer program product. Thus, the concepts described herein may take the form of an entirely hardware embodiment, an entirely software embodiment, or an embodiment combining software and hardware aspects, which are collectively referred to herein as "circuits" or "modules." Furthermore, the present disclosure may take the form of a computer program product on a tangible computer-readable storage medium having computer program code embodied in the medium and executable by a computer. Any suitable tangible computer-readable storage medium may be utilized, including hard disks, CD-ROMs, electrical storage devices, optical storage devices, or magnetic storage devices.

Some embodiments are described herein with reference to flowcharts and/or block diagrams of methods and systems. It should be understood that each block in the flowchart examples and/or block diagrams, and combinations of multiple blocks in the flowchart examples and/or block diagrams may be implemented by computer program instructions. These computer program instructions may be provided to a processor of a general purpose computer (thus creating a special purpose computer), a special purpose computer, or other programmable information processing device used to produce the machine such that the instructions (executed by the processor of the computer' or other programmable information processing device) create means for implementing the functions/actions specified in the flowcharts and/or block diagrams.

These computer program instructions may also be stored in a computer-readable memory or storage medium that instructs a computer or other programmable information processing device to operate in a specific manner, so that the instruction means stored in the computer-readable memory generate articles including the instructions for implementing the functions/actions specified in one or more blocks of the flowcharts and/or block diagrams.

The computer program instructions may also be loaded into the computer or other programmable information processing device, causing a series of operational steps to be executed on the computer or other programmable device to generate computer-implemented processing, so that the instructions executed on the computer or other programmable device to provide steps for implementing the functions/actions specified in one or more blocks of the flowcharts and/or block diagrams.

An embodiment of the present disclosure also provides a computer-readable storage medium on which a computer program is stored. When the computer-readable storage medium is set on the display device, the programs, when being executed by the processor, perform the steps of the display method as shown in FIGS. 1~16. Alternatively, when the computer-readable storage medium is provided on the terminal, the programs, when being executed by the processor, perform the steps of the visible light communication transmission method as shown in FIGS. 17~19. The detailed description refers to the description of the embodiments as shown in FIGS. 1~19, which will not be described here again.

In the embodiments of the present disclosure, the first image frame and the second image frame may be obtained by compensating the grayscale value of the image frame to be displayed. In this way, the grayscale difference between the first image frame and the second image frame will be larger, i.e., the grayscale amplitude is enlarged, which is beneficial to reduce the difficulty for the terminal to perform the identification. In addition, in the embodiments of the present disclosure, smaller grayscale compensation may be applied to the grayscale values of the first image frame and the second image frame, so that the user cannot perceive the grayscale difference during the viewing process, and image grayscale distortion may be avoided, in order to ensure the viewing effect.

In this disclosure, the terms "first" and "second" are used for descriptive purposes only, and should not be interpreted to indicate or imply relative importance. The term "plurality" refers to two or more, unless explicitly defined otherwise.

Those skilled in the art will readily conceive of other embodiments of the present disclosure after considering the specification and practicing the disclosure disclosed herein. This disclosure is intended to cover any variations, uses, or adaptations of this disclosure that conform to the general principles of this disclosure and include the common general knowledge or conventional technical means in the technical field not disclosed by this disclosure. It is intended that the specification and examples are considered as examples only, with a true scope and spirit of the disclosure being indicated by the following claims.

It should be understood that the present disclosure is not limited to the precise structure that has been described above and illustrated in the drawings, and various modifications and changes may be made without departing from the scope thereof. The scope of the disclosure is limited only by the following claims.

We claim:

1. A display method, comprising:
    acquiring an image frame to be displayed and a corresponding binary code stream;
    adjusting a grayscale value of a corresponding pixel point in the image frame to be displayed based on a grayscale adjustment information set corresponding to each code element in the binary code stream, to obtain a first image frame and a second image frame that are different from the image frame to be displayed; and
    displaying the first image frame and the second image frame.

2. The display method according to claim 1, wherein said adjusting the grayscale value of the corresponding pixel point in the image frame to be displayed based on the grayscale adjustment information set corresponding to each code element in the binary code stream to obtain the first image frame and the second image frame that are different from the image frame to be displayed comprises:

acquiring the grayscale adjustment information set corresponding to each code element, the grayscale adjustment information set comprising a first grayscale compensation value and a second grayscale compensation value; and adjusting the grayscale value of each pixel point in the image frame to be displayed according to the first grayscale compensation value to obtain the first image frame, and adjusting the grayscale value of each pixel point in the image frame to be displayed according to the second grayscale compensation value to obtain the second image frame.

3. The display method according to claim 2, wherein said adjusting the grayscale value of each pixel point in the image frame to be displayed according to the first grayscale compensation value to obtain the first image frame comprises:

calculating, for each pixel point in the image frame to be displayed, an algebraic sum of the grayscale value of the pixel point and the first grayscale compensation value; and determining the algebraic sum as a grayscale value of the corresponding pixel point in the first image frame;

or, said adjusting the grayscale value of each pixel in the image frame to be displayed according to the second grayscale compensation value to obtain the second image frame comprises:

calculating, for each pixel point in the image frame to be displayed, an algebraic sum of the grayscale value of each pixel point and the second grayscale compensation value; and determining the algebraic sum as a grayscale value of the corresponding pixel point in the second image frame.

4. The display method according to claim 3, wherein prior to adjusting the grayscale value of the corresponding pixel point in the image frame to be displayed based on the grayscale adjustment information set corresponding to each code element in the binary code stream, the method further comprises:

compressing the grayscale of each pixel point in the image frame to be displayed according to a preset grayscale compression formula.

5. The display method according to claim 3, wherein said adjusting the grayscale value of the corresponding pixel point in the image frame to be displayed based on the grayscale adjustment information set corresponding to each code element in the binary code stream comprises:

in response to determining that the pixel point comprises $M_1$ sub-pixels, adjusting grayscale values of $M_2$ sub-pixels in the $M_1$ sub-pixels, where $M_1$ is a positive integer greater than or equal to 3, and $M_2$ is a positive integer less than or equal to $M_1$.

6. The display method according to claim 1, wherein when the image frame to be displayed is divided into Z regions where Z is a positive integer, prior to adjusting the grayscale value of the corresponding pixel point in the image frame to be displayed based on the grayscale adjustment information set corresponding to each code element in the binary code stream, the method further comprises:

determining a region where the pixel point corresponding to each code element in the binary code stream is located, the region where the pixel point corresponding to each code element is located being one of the Z regions; and determining a grayscale adjustment information set corresponding to the region as the grayscale adjustment information set corresponding to the code element, based on a corresponding relationship between regions and grayscale adjustment information sets.

7. The display method according to claim 6, wherein the first grayscale compensation values in the grayscale adjustment information sets corresponding to different regions in the image frame to be displayed are different, and/or the second grayscale compensation values in the grayscale adjustment information sets corresponding to different regions in the image frame to be displayed are different.

8. The display method according to claim 7, wherein the first grayscale compensation value is a positive number, and the second grayscale compensation value is a negative number.

9. The display method according to claim 7, wherein the first grayscale compensation value and the second grayscale compensation value are mutually opposite numbers.

10. A non-transitory computer-readable storage medium having stored thereon a computer program, wherein the program, when executed by a processor, performs the steps of the method according claim 1.

11. A visible light communication transmission method, comprising:

acquiring two image frames from a video stream, wherein corresponding pixel points in the two image frames are identical except for grayscale values of the corresponding pixel points;

acquiring a grayscale amplitude image from the two image frames;

acquiring a binary code stream according to the grayscale amplitude image, based on a corresponding relationship between grayscale amplitudes and code elements;

determining content needed to be rendered based on the binary code stream; and outputting the content needed to be rendered.

12. The visible light communication transmission method according to claim 11, wherein prior to acquiring the binary code stream according to the grayscale amplitude image, the method further comprises:

dividing the grayscale amplitude image into Z regions according to a criterion that the grayscale amplitude variation amount is the same within a region, where Z is a positive integer;

wherein said acquiring the binary code stream according to the grayscale amplitude image based on the corresponding relationship between grayscale amplitudes and code elements comprises:

acquiring a binary code stream corresponding to at least one of the Z regions of the grayscale amplitude image, based on the corresponding relationship between grayscale amplitudes and code elements.

13. The visible light communication transmission method according to claim 12, wherein prior to acquiring the binary code stream corresponding to the at least one of the Z regions of the grayscale amplitude image based on the corresponding relationship between grayscale amplitudes and code elements, the method comprises:

acquiring historical data stored locally;

determining behavior preference characteristics of a target object based on the historical data; and determining a region corresponding to the behavior preference characteristics based on a corresponding relationship between behavior preference characteristics and grayscale amplitudes;

wherein said acquiring the binary code stream corresponding to the at least one of the Z regions of the grayscale amplitude image comprises:

acquiring a binary code stream of the region of the grayscale amplitude image corresponding to the behavior preference characteristics.

14. A visible light communication transmission device, comprising:

a memory storing computer program codes; and a processor configured to execute the computer program codes to perform the visible light communication transmission method of claim 11.

15. A non-transitory computer-readable storage medium having stored thereon a computer program, wherein the program, when executed by the processor, performs the steps of the method according to claim 11.

16. A display device, comprising:

a display;

a memory storing computer program codes; and a processor configured to execute the computer program codes to:

acquire an image frame to be displayed and a corresponding binary code stream;

adjust a grayscale value of a corresponding pixel point in the image frame to be displayed based on a grayscale adjustment information set corresponding to each code element in the binary code stream, to obtain a first image frame and a second image frame that are different from the image frame to be displayed; and control the display to display the first image frame and the second image frame.

* * * * *